US008199856B2

(12) United States Patent
Belogolovy et al.

(10) Patent No.: US 8,199,856 B2
(45) Date of Patent: Jun. 12, 2012

(54) ARRANGEMENTS FOR INTERFERENCE MITIGATION UTILIZING RECURSIVE ESTIMATION

(75) Inventors: Andrey V Belogolovy, St. Petersburg (RU); Mikhail Lyakh, Saint-Petersburg (RU); Alan E. Waltho, San Jose, CA (US); Anu Hannele Huttunen, Helsinki (FI); Risto Kaunisto, Espoo (FI)

(73) Assignee: Intel Corporation, Santa Clara, CA (US)

( * ) Notice: Subject to any disclaimer, the term of this patent is extended or adjusted under 35 U.S.C. 154(b) by 891 days.

(21) Appl. No.: 12/154,856

(22) Filed: May 27, 2008

(65) Prior Publication Data
US 2008/0292034 A1 Nov. 27, 2008

Related U.S. Application Data

(60) Provisional application No. 60/940,304, filed on May 25, 2007.

(51) Int. Cl.
*H03K 9/00* (2006.01)

(52) U.S. Cl. ........ 375/316; 375/346; 375/355; 341/155; 341/120; 341/143

(58) Field of Classification Search .................. 375/346, 375/355, 350, 316
See application file for complete search history.

(56) References Cited

U.S. PATENT DOCUMENTS

| | | | |
|---|---|---|---|
| 7,558,337 B2 * | 7/2009 | Ma et al. | 375/316 |
| 2006/0164263 A1 * | 7/2006 | Park et al. | 341/50 |
| 2008/0063124 A1 * | 3/2008 | Song et al. | 375/355 |
| 2008/0292032 A1 * | 11/2008 | Belogolovy et al. | 375/346 |

* cited by examiner

*Primary Examiner* — Eva Puente
(74) *Attorney, Agent, or Firm* — Schubert Law Group PLLC

(57) ABSTRACT

A method is disclosed that includes receiving a signal having a data vector component and an interfering component and creating a first set of digitized data that represents the interfering component. The method can also generate a polynomial equation based on the first set of digitized data and generate a second set of digitized data that represents a data vector component of the received signal. The polynomial equation can be subtracted from the received signal to cancel at least a portion of the interfering component and provide an interference mitigated signal representing the data vector component. An error in the interference mitigated signal can be determined and the interference mitigated component can be recalculated based on the error. Other embodiments are also disclosed.

24 Claims, 10 Drawing Sheets

ARRANGEMENTS FOR INTERFERENCE MITIGATION UTILIZING RECURSIVE ESTIMATION

CROSS-REFERENCE TO RELATED APPLICATIONS

This application claims priority to a provisional application No. 60/940,304, entitled Noise Mitigation, filed on May 25, 2007. The contents of provisional application No. 60/940,304 are hereby incorporated by reference.

FIELD

The present disclosure is related to the field of wireless communication, and more particularly, to the field of mitigating interference in data recovery systems.

BACKGROUND

Wireless communications systems have become ubiquitous. With so many systems emitting radio frequency energy, the environment is filled with energy that can interfere with systems that are trying to communicate. Many wireless systems such as wireless local area networks, cordless telephones and Bluetooth® compatible devices transmit a low power signal where interfering signals often have energy levels that are magnitudes greater than low power systems. Accordingly, it can be difficult to communicate low power digital data with such high levels of interference.

Many wireless communication systems utilize a wideband topology. Wideband receivers can simultaneously transmit and receive on numerous frequencies within a given bandwidth. Many wideband receivers, such as those utilized by wireless local area networks (WLANs), can be subjected to narrow band interference from other devices that emit interference having frequencies that fall within the pass band of the wideband receiver. Some interfering devices may not even be communication systems. For example, microwave ovens and motors can emit interference.

To address such interference there has been significant effort in the field of noise mitigation. One such interference mitigation technique is noise cancellation, where disruptive noise can be detected and inverted (shifted 180 degrees) to create an anti-phase signal that can be added to a delayed incoming signal. Such a process can cancel at least a portion of the noise component, making it easier for a system to recover data over a wireless link. Traditional systems often have multiple receive paths, one path for the desired signal and another path for generating the anti-phase signal. Thus, wideband receivers that utilize four channels often have eight receive paths. Other traditional interference mitigation systems utilize filtering processes. These filtering processes are generally not effective for mitigating interferences that have frequency that fall within the receiver pass band because filtering these frequencies degrades the desired signal.

Narrowband interference is a type of electromagnetic interference that often occurs at relatively high levels in a band of frequencies that are smaller or narrower than the total bandwidth of the receiver experiencing interference. One common type of narrow band interference that is problematic for WLAN type devices comes from radios transmitting voice or data at low rates. A few examples of such narrow band type devices can include cell phones such as global system for mobile communications (GSM) phones, Bluetooth® compatible devices and cordless phones.

Generally, TDMA (time division multiple access) type devices are allocated a time slot in which they can transmit and receive, and thus TDMA devices create periodic interference or high level burst interference that can be disruptive for systems that operate at low signaling levels. Although such devices are typically assigned an "exclusive" frequency band, sidebands or harmonics of the transmitted frequency that are emitted often fall within the active bandwidth for other systems.

One current standard for the wideband wireless local area networks is the Institute of Electrical and Electronic Engineers (IEEE) 802.11 standard, originally published in October of 1999. The 802.11 standard specifies that WLAN device enter a power conservation mode (and not transmit or receive) when the signal being received is less than a predetermined amount over the noise level. This standard caters to battery powered WLAN compatible devices because if no signal is available for reception, the system can enter the sleep mode to conserve battery power. High levels of interference can mask the desired signal so that the WLAN receiver is unable to correctly operate in the power conservation mode.

While filtering techniques can be used to remove certain types of interference, filtering can also cause a loss of data, since filtering typically degrades the signal or removes part of the desired signal. Some have attempted to utilize a tap notch finite impulse response (FIR) filter to mitigate interference though filtering. This approach is not very practical because the length of the notch filter (required sampling size) is typically too large, and such a filter requires more than a WLAN preamble length for initialization. For example, a typically WLAN compatible transmission has a preamble with 10 standard transfer specification (STS) which requires 160 samples. The overall latency created by such a FIR filter is too high, and the complexity of such a system is also a limiting factor.

As stated above, the feature in the IEEE 802.11 specification that is intended to reduce power consumption of a WLAN receiver when a useable signal is not present often causes a dropped communication. In addition, 802.11 compliant systems can easily be jammed with an interfering signal even though proper interference mitigation would allow an 802.11 compliant signal to be effectively processed by the receiver. Traditional receiving systems without robust interference mitigation systems often have communication failures, even in the middle of packet reception. Thus, most traditional receiving systems have less than perfect interference mitigation systems, and such systems will drop a communication session even though with proper mitigation a useable signal would be present and communications could continue uninterrupted.

BRIEF DESCRIPTION OF THE DRAWINGS

Aspects of the disclosure will become apparent upon reading the following detailed description and upon reference to the accompanying drawings in which, like references may indicate similar elements.

DETAILED DESCRIPTION OF EMBODIMENTS

Figure 1:
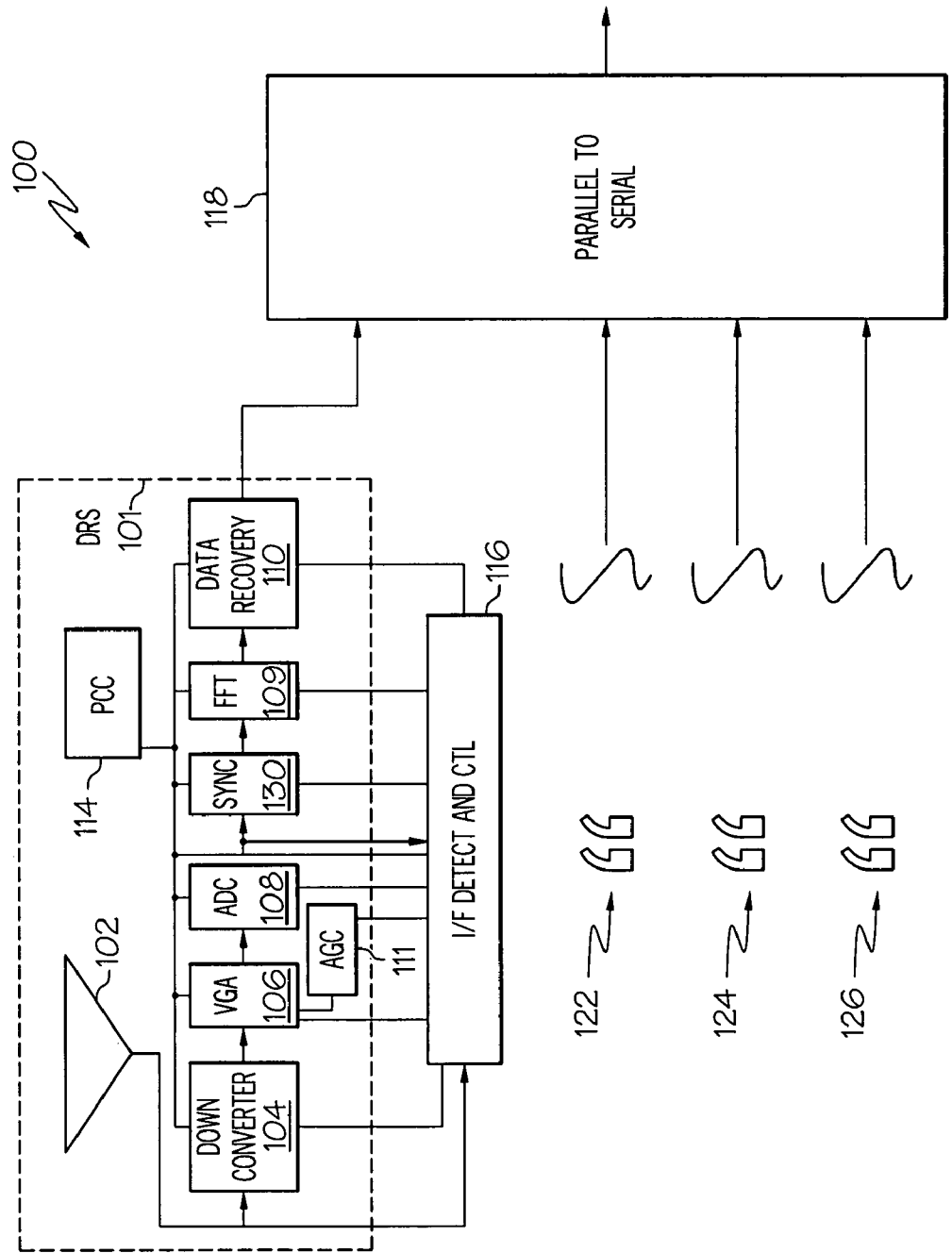
FIG. 1 is a block diagram of a data recovery system with an interference mitigation system.

The following is a detailed description of embodiments of the disclosure depicted in the accompanying drawings. Systems and methods are disclosed wherein a desired signal component of a received signal can be filtered out to create a signal with an emphasized interference component. An equation can be generated that estimates the resulting interference waveform. An anti-phase version of the equation can be created and then added to the received signal to reduce the interference portion or to remove at least a portion of the interference component from the received signal. Accordingly, a robust data signal representing the desired component can be extracted from the resulting signal and this signal can be provided to a data recovery system.

In some embodiments a system is disclosed that can mitigate interference caused by devices that are compatible with a global system for mobile communications (GSM) system. These GSM compatible transmissions often interfere with WLAN compatible receivers. The embodiments are in such detail as to clearly communicate the disclosure. However, the amount of detail offered is not intended to limit the anticipated variations of embodiments. On the contrary, the intention is to cover all modifications, equivalents, and alternatives falling within the spirit and scope of the present disclosure as defined by the appended claims.

In the following description, for purposes of explanation and not limitation, specific details are set forth such as particular structures, architectures, interfaces, techniques, etc. in order to provide a thorough understanding of the various aspects of the disclosure. However, it will be apparent to those skilled in the art having the benefit of the present disclosure that the various aspects of the disclosure may be practiced in other examples that depart from these specific details. In certain instances, descriptions of well-known devices, circuits, and methods are omitted so as not to obscure the description herein with unnecessary detail.

While specific embodiments will be described below with reference to particular configurations of hardware and/or software, those of skill in the art will realize that the disclosed embodiments may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Ideally, a WLAN device with a robust interference mitigation system will synchronize with a transmitter, commence packet processing and continue packet processing as long as a signal can be detected, irrespective of burst or narrowband interference. As discussed in the background, wideband data receivers, such as IEEE 802.11 compatible WLAN receivers, are often subjected to interferences including high level interference of a periodic burst or continuous nature.

One specific embodiment disclosed is the mitigation of interference from a third harmonic of a GSM type cell phone that falls into the frequency band utilized by WLAN receivers. The arrangements described may be used alone or in combination with other interference mitigation to mitigate high levels of narrowband interference that fall within the pass band of a wideband victim receiver As stated above a number of wireless devices operate using a time division multiple access protocol that, is difficult to accurately detect and quantify. It can be appreciated that the arrangements disclosed can accurately detect TDMA based interference and such a detection and quantification of this TDMA interference can be utilized to provide superior cancellation of such time based interference.

Typical wideband receivers are designed with a small dynamic range such that they can be economically manufactured. Dynamic range can be described as range of signal levels that the receiver can effectively process. Alternately described, the dynamic range of a receiver can be defined by the ratio of the maximum signal level to minimum signal level that a system can effectively process. It can be appreciated that as the dynamic range and signal level of a receiver design decreases, it becomes more difficult to mitigate interference. This occurs because relatively high levels of burst interference can saturate the amplifiers of the system. When these amplifiers are saturated, interference cancellation subsystems cannot effectively operate and hence in such circumstances data recovery from the desired signal cannot be accurately performed.

In an 802.11 compatible device, when the signal level of the desired signal on one or more channels goes below the noise level or drops more than 3 dB due to incoming interference, the device will often enter a "sleep mode," thereby dropping a current communication session. This often occurs even though the interference is temporary and a robust or comprehensive interference detection/mitigation system could prevent the dropping of communication sessions and can facilitate continued data recovery during periods of interference. Alternately stated, sporadic or periodic interference from time domain based devices, even though short lived, if not mitigated can severely interrupt communications even in the middle of receiving a packet.

As stated in the background, one significant interferer with 802.11 compliant WLAN communications is transmitting GSM compatible devices. Although such devices are assigned a different operating frequency than an 802.11 compatible device, a GSM system often emits sideband power or harmonic power (typically a third harmonic) having frequencies that fall within the frequencies assigned to 802.11 compliant devices. Such interference can cause significant interference because GSM devices utilize relatively high power levels. As stated above, such a GSM transmission will often disrupt and terminate WLAN communications even during the middle of a packet reception.

Many traditional cancellation type interference mitigation systems cross modulate to cancel the noise portion of the received signal. Cross modulation is a multiplicative process caused by non linearity. Other systems utilize a linear summation process in which an inverted replica of the interference is added to the signal. A phase shifting plus amplitude weighting can be done to ensure that the two replica signals have an "exact" anti-phase and the amplitude weighting is utilized to match the amplitudes of the signals so that complete cancellation can occur.

As described below, the disclosed system can detect the existence of different types of interference and profile the detected interference. The disclosed system can utilize a variety of specialized sensors where each sensor can detect one or more characteristics of the interference. Each sensor can produce one or more control signal(s) to one or more interference mitigation modules. Thus, based on the type of interference detected, or the characteristics of the interference detect, multiple interference mitigation modules or sub-systems can be controlled, such that the sub-systems perform in a coordinated manner to provide substantial mitigation of the detected interference.

It can be appreciated that there are many types of interferences, or that interferences can have many different characteristics where interference with different characteristics (that can be quantified) can be more effectively mitigated with a tailored or specialized mitigation system. There are an infinite number of different interference characteristics that can negatively affect a data recovery system and these characteristics can even change many times per second. Thus, it can be appreciated that it is beneficial to provide a system that can detect different types and characteristics of interference and define or profile the interference that is disrupting data recovery such that an effective remedy can be implemented in real time.

Based on the profile of the interference a mitigation control system can select, and control a type of interference mitigation feature in one or more stages of the data recovery system to provide effective mitigation of the detected interference. Such detection and selection can be performed in real time and thus, dynamic based interference mitigation control can be achieved. In addition, based on detected interference, multiple receiver control sub systems, that are mutually exclusive, can be activated concurrently to better facilitate effective interference mitigation processes within the system. It can be appreciated that implementing interference mitigation processes and systems that are tailored to mitigate interference caused by interference energy with particular detected characteristics can significantly increase the performance of data recovery systems.

One specialized interference detection system disclosed is a narrow band interference detection system for an 802.11 compliant system. In the disclosed narrowband interference detection system, an incoming wideband signal can be divided into electromagnetic energy that has specific frequency ranges or sub bands. The sub bands can have adjacent frequency ranges from a lowest frequency range to a highest frequency range, where each sub band can have a contiguous frequency with an adjacent sub band, except for the end bands.

In one embodiment, a narrow band interference profiler for an 802.11 compatible system can have a center frequency of 5.8 GHz and a bandwidth of 20 MHz. The 20 MHz bandwidth can be divided into four 5 MHz sub bands. Although the disclosed embodiment divides the incoming energy into four equal sub-bands, this is not a limiting factor. Separating the wideband signal into sub bands allows the energy for each sub band to be determined. In some embodiments the energy levels can be compared to a threshold value to determine its relative level.

Many narrow band interfering systems, such as a GSM system, will emit only a limited number of frequencies in the 20 MHz range. These limited numbers of frequencies will typically fall into a single sub-band. When interference is detected in a single sub band, or even two of the sub bands the narrow band interference profiler can create a narrow band interference detection signal and/or a signal that indicates which sub bands of frequencies are experiencing interference, and how much interference is being received on each sub band.

To determine such parameters, the interference profiler can compare the relative energy levels present in each of the sub bands, and determine whether the interference present is narrow band interference. Narrow band interference occurs when high interference levels are not detected in all sub bands. Such a detection of narrow band interference can be utilized to distinguish narrow-band noise from broad-band noise, which will typically manifest as relatively high energy levels in all sub bands. Alternatively stated, broad-band noise, such as white noise, typically occurs across the entire bandwidth of the receiving system and is prominent when no WLAN compatible transmissions are present.

In some embodiments, in response to the sub band that is experiencing interference, the narrow band interference profiler can activate a specific pass band filter, or filter function, that is centered at the interference frequency (ies). Such a filter can enhance the level of or isolate the interference portion of the received signal or the narrow band interference with respect to the wideband signal. Isolating the interference portion of the received signal allows for more accurate extraction of the phase and amplitude of the interfering signal. In accordance with the present disclosure the isolated/accurately detected phase and amplitude portion of the interference can be utilized by an interference cancellation system to generate an anti-phase signal to cancel the interference portion of the received signal Another specialized interference detection module, such as a time detection module, can time sample the interference signal to determine if the interference is periodic (i.e. from a time domain system). Thus, an asserted narrow band interference detection control signal in combination with an asserted periodic interference control signal can create a profile.

Accordingly, the disclosed system can identify a specific type of interference and provide different control signals or output signals based on the detection or determination. The disclosed interference profiler can provide a plurality of different control signals that can activate multiple types of interference mitigation systems and/or processes. It can be appreciated that specific types of interference mitigation systems or interference mitigation methods are more effective for specific types of interference. It can also be appreciated that when the disclosed arrangements are utilized by 802.11 compliant systems during a communication session, the system can detect narrow band time domain interference and send a control signal to disable a sleep mode module, such that if the received signal changes by more than a predefined level, typically three dB, the system will not cease communications.

Referring to FIG. 1, an embodiment of a wideband communication system 100 that includes a data recovery system (DRS) 101, and an interference (I/F) detection and control (CTL) module 116, is disclosed. In FIG. 1, the data recovery system 101 has more detail and in FIG. 2, the I/F detection and control module has more detail. Thus, the systems of FIG. 1 and FIG. 2 have like components. The data recovery system 101 can include an antenna 102, a down converter 104, a variable gain amplifier (VGA) 106, an automatic gain controller (AGC) 111, an analog to digital converter (ADC) 108, a synchronization module 130, a power conservation control (PCC) module 114, a fast Fourier transform module 109 and a data recovery module 110.

The communication system 100 can also include a parallel to serial converter 118. The parallel to serial converter 118 can accept a plurality of inputs from data recovery systems, such as data recovery system 101, 122, 124, and 126.

In operation, a signal can be received via antenna 102 and the electromagnetic energy of the received signal can be down converted by down converter 104 and provided to VGA 106. The down converter can be a mixer. The VGA 106 can amplify the signal and the ADC 108 can convert the received analog signal into a digital signal. The AGC 111 can provide a gain control signal to the VGA 106, thereby keeping the VGA in an acceptable operating range.

The received signal, a processed received signal and various other operating parameters of the data recovery system 101 can be provided to the I/F detection and control system 116. The I/F detection and control system 116 can detect interference characteristics by directly processing the received signal or processing a version of the received signal that has been processed or can detect abnormal parameters of the data recovery system 101 and can send a corrective control signal to the data recovery system 101. It can be appreciated that the I/F detection and control module 116 is connected to each module (i.e. 104, 106, 108, 130, 110, 111 and 114) such that the I/F detection and control module 116 can detect interference or its consequences and can activate an interference mitigation system or process at most locations in the DRS 101.

The I/F detection and control module 116 can select an interference mitigation solution in real time based on detected characteristics of the interference and can select and implement a mitigation solution that is a "best fit." Such a comprehensive interference detection and correction feature can significantly increase the reliability of communications. The latency introduced by the disclosed system is significantly less than the latency allowed by most current communication standards, such as the IEEE 802.11 standard.

Many systems have a power consumption control system such as PCC 114. In traditional systems, interference can cause a PCC to place a system in a "low power" or "sleep mode." In some embodiments, the I/F detection and control module 116 can control the PCC 114 and not allow the PCC 114 to place the system 101 in a sleep mode due to particular types of interference that can cause changes in signal levels. Cell phones often create this type of interference. The disclose interference identification/mitigation system 100 can also be utilized with most transmission content types, and can allow a user to simultaneously talk on their cellular based telephone and conduct a voice call, while receiving internet content and e-mail or video on their computer.

As stated above, typical wideband data receivers have a very limited dynamic range, and the amplifiers of such receivers are often subjected to periodic bursts of interference. Such bursts can force an amplifier to the top of its active range or even the bottom of its active range. When this happens, data cannot be recovered from the received signal. Thus, when a burst of interference enters a VGA, the VGA can become saturated or under run, where the VGA does not amplify the desired signal and communication failures often result. When specific interference parameters are detected by the I/F detection and control module 116, the I/F detection and control module can control the AGC 111 such that it prevents the VGA 106 from becoming saturated or under running due to the interference. Such readjustment of the gain can reduce or eliminate system failures and communication failures.

The interference system 100 can maintain a dynamic operating range for a receiver in the presence of periodic narrowband interference throughout the period of the interference and during packet reception. Other interference mitigation techniques suffer from transitions in signal levels which often saturate or under drive (i.e. do not provide enough signal) the analog to digital converter (ADC). As stated above such a condition often creates unusable data. The FFT module 109 can provide a frequency spectrum estimation of the received signal.

The above discussion has been focused on a single incoming signal. In the case of wideband communications such as 802.11 compliant communications, many different communication channels can be utilized concurrently and these channels comply with orthogonal frequency division multiplexing symbols. In embodiments that support 802.11 compatible systems, the interference can be estimated and cancelled in the time domain prior to the FFT 109. Alternatively, provided that there is sufficient dynamic range, the cancellation could be performed after the FFT so that cancellation only occurs in those frequency bins in which the interference occurs. It can be appreciated that only one channel has been discussed above for simplicity but interference for many different channels can also be mitigated concurrently.

Figure 2:
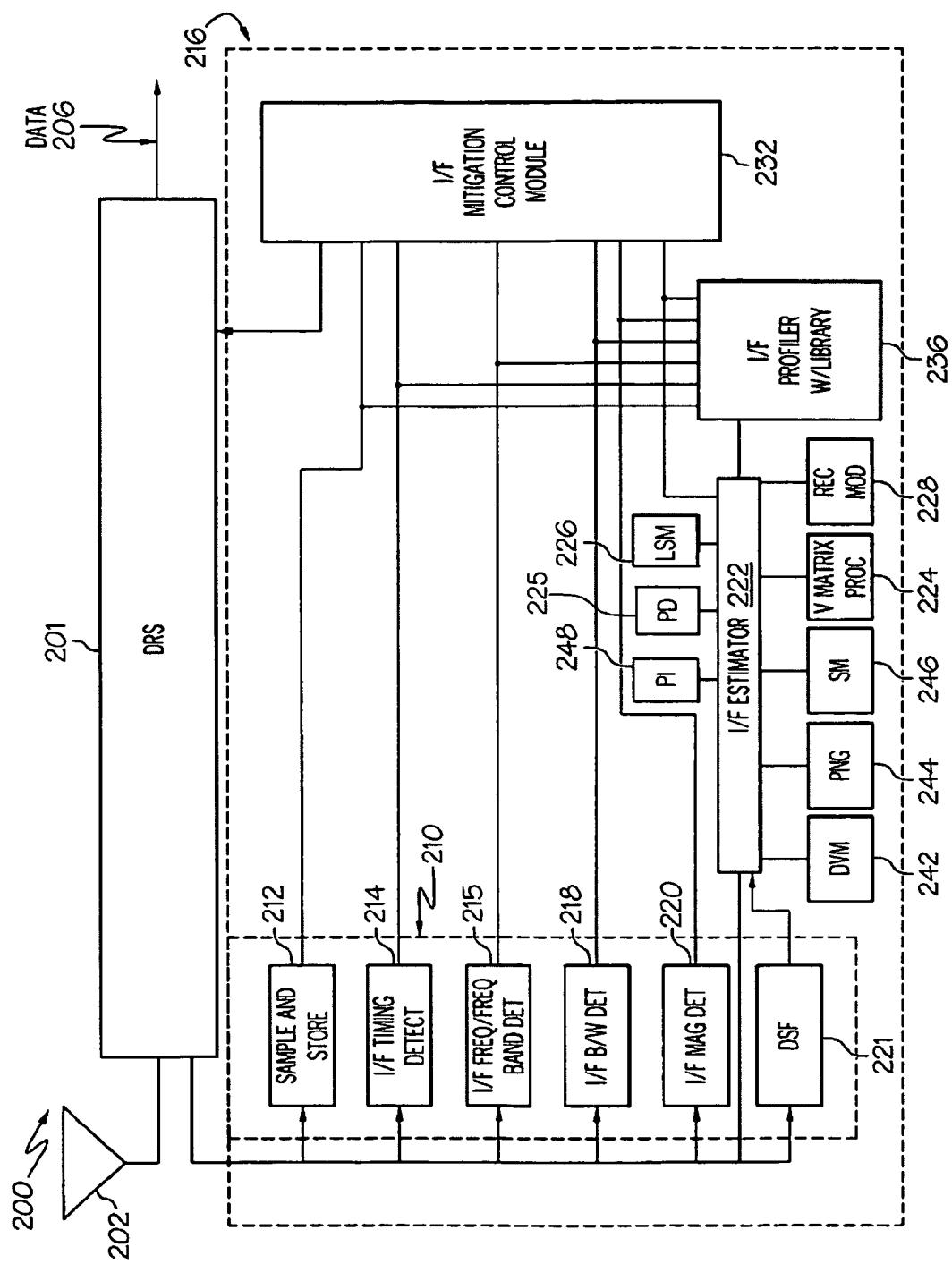
FIG. 2 is a block diagram of an interference mitigation system with a data recovery system.

Referring to FIG. 2, an embodiment of a wideband communication system 200, similar to the embodiment of FIG. 1, is illustrated. In FIG. 1, the data recovery system 101 has more detail than the data recovery system 201 of FIG. 2. In FIG. 2, the I/F detection and control module 216 has more detail than the I/F detection and control module 116 of FIG. 1. The system 200 can include a data recovery system 201 that accepts a signal on antenna 202 and provides data at its output 206 and an I/F detection and control module 216.

The I/F detection and control module 216 can include an interference sensor/detection subsystem 210, a desired signal filter 221 an I/F estimator 222 that is supported by Vandermonde matrix processor module 224, a least square calculation module (LSM) 226 and a recursion module, or recalculation module, (REC MOD) 228. The I/F detection and control module 216 can also include a phase detector (PD) 225, an interference mitigation control system 232, and an interference profiler 236 with a library that can store interference profiles and their associated mitigation control signals. The associated mitigation control signals can provide one or more control signals or algorithms that are proven to mitigate interference with a particular profile.

The REC MOD 228 may couple with the I/F estimator 222 to determine an error in the interference mitigated signal and to recalculate the interference mitigated signal utilizing the error. The REC MOD 228 may recalculate the interference mitigated signal utilizing the error by altering the polynomial equation utilizing the error. And the REC MOD 228 may recalculate the interference mitigated signal utilizing the error by altering the first set of digitized data based on the error. Further embodiments may involve incrementing a counter based on recalculating the interference mitigated signal. Further embodiments may involve incrementing a counter based on recalculating the interference mitigated signal. And still further embodiments may involve storing a number and if the counter reaches the number, ceasing a recalculation process.

In some embodiments, the I/F detection and control module 216 can provide interference cancelation features. The interference cancellation features provided by the I/F detection and control module 216 can include a data vector module to detect a data vector from a received transmission, a polynomial generator module to generate a polynomial equation representing interference and a subtraction module to subtract the polynomial equation from the received transmission.

The I/F detection and control module 216 can also include a phase inverter to invert the phase of the polynomial equation to facilitate the subtraction.

The I/F sensor/detection subsystem 210 can include components enclosed by dashed line 210. The I/F sensor/detection and control module 210 can include a sample and store module 212, an I/F timing detection module 214, an I/F frequency and frequency band detection module 215, an I/F band width detection module 218, and an I/F magnitude detection module 220. The I/F sensor/detector subsystem 210 can detect periodic interferences emitted from time domain multiple access (TDMA) compatible devices, high clocks and from signals with periodic frequency and hopping sequences, such as Bluetooth® compatible systems, to name a few.

The components of I/F sensor/detection sub system 210 can be specialized. The I/F sensor/detection sub system 210 can detect multiple interference parameters, interference characteristics and abnormal operating conditions of the DRS 201. For example, the sample and store module can sample and store data relating to the input signal and can also accept monitor outputs of the DRS 201. Some interference may manifest as abnormal conditions at various locations with the DRS 201, and the sample and store module 212 can detect abnormalities caused by such interference and store data related to such abnormalities.

The I/F timing detection module 214 can detect and convey nearly all timing parameters related to an interfering signal. The I/F timing detection module 214 can be a time domain interference detector. The I/F timing detection module 214 can have a timer or a time clock to time stamp data that defines timing attributes of the interference. For example, the I/F timing detection module 214 can detect and provide real time data or relational timing data regarding a start time, an end time, a duration of pulsed interference and can provide synchronization information that can be utilized to predict a time when the next interference pulse can be expected.

The I/F profiler 236 can compare this timing information with a timing signature for known communication standards from the library to identify an interference and predict future interferences and control the DRS 201 accordingly. The library can store digital data templates representing known timing patterns for standardized communication protocols. The I/F frequency/frequency band detection module 215 can detect the frequency or frequencies of the interfering signal and/or can detect a band of frequencies that are creating interference. The I/F bandwidth detector 218 can detect the bandwidth of the interference.

The I/F bandwidth detector 218 can make a relative determination, of whether the received interference is narrow band or broad band. In some embodiments, the I/F bandwidth detector 218 can distinguish whether the interference is at the noise floor or is "white noise." As stated above, a received signal has an interference component and a desired signal component. The I/F detection and control module 216 can facilitate separating the desired signal from the interference component such that data can be recovered from the received signal. In some embodiments, the desired signal filter 221 can be tuned to filter the desired signal out of the received signal to sharpen the characteristics of the interference component.

The filter 221 can reduce the magnitude of the desired signal in relation to the interference component. The filtered signal can be provided to the I/F estimator 222. The filtered signal can allow the I/F estimator 222 to provide a more accurate estimation of the interference component of the received signal. Although not illustrated, all components of the I/F sensor/detection sub system 210 could be provided with the filtered signal from the desired signal filter 221.

The I/F magnitude detector 220 can detect the energy level of different frequencies or bandwidths of the interfering signal. Generally, the I/F sensor/detection sub system 210 can detect different characteristics of harmful interference and can provide detailed information about such interference, including the attributes of interference, the classifications or profiles of the interference, the frequency(ies) and bandwidth, the magnitudes, and the timing arrangements and abnormal conditions in the DRS 201.

In operation, the I/F mitigation control module 232 can accept all parameters and characteristics that the system 200 can detect relating to interference. For example, the I/F mitigation control module 232 can accept input from the I/F profiler 236, from the I/F estimator 222 and the I/F sensor/detection subsystem 210, and can generate and send one or more interference mitigation control signals to the DRS 201. As stated above, knowing as much as possible about the interference causing data recovery problems in the DRS 201 allows the I/F mitigation control module 232 to tailor one or more solution(s) via control commands. If the parameters provided by systems 210 and 222 degrade after such control commands are issued, the I/F mitigation control module 232 can recognize such a less than perfect control response and attempt other combinations of control signals. The system can iterate until the interference problem is mitigated.

The I/F profiler 236 can monitor the outputs of the I/F sensor/detection module 210 and the profiler 236 can utilize the outputs to create a profile defining and quantifying the detected interference. If an interference profile cannot be matched to a standard profile related to a specific communication standard, the detected interference profile can be created and stored as an "interference signature" in the library. The interference signature can define what detection data is created by the system 200. If a determined signature can be matched to a standard profile, a specific set of control signals can be provided by the library to the I/F mitigation control module 232, and such instructions can be applied to the DRS 201.

The I/F mitigation control module 232 can also include artificial intelligence, and can create links and assign weights to links between interference data and control commands that successfully mitigate interference. A link between an interference signature and a successful control configuration can achieve a greater weighting every time it is successful. In some embodiments, a user can set the links in the I/F mitigation control module 232 such that the existence of one or more detected interference parameters on the input of the I/F mitigation control module 232 triggers the I/F mitigation control module 232 to send a specific control signal or a sequence of control signals to the DRS 201.

Although only one line is drawn between the I/F mitigation control module 232 and the DRS 201, as is illustrated in FIG. 1, it is intended that the I/F mitigation control module 232 can invoke an interference mitigation method or subsystem at every stage or component of the DRS 201. Such control at so many locations within the DRS 201 allows for customized solutions for a specific type of interference. Such comprehensive detection and control can allow the DRS 201 to operate flawlessly in the presence of significant interference.

Even when a match does not occur, the I/F profiler 236 can store a profile for a detected interference occurrence. If the source of the interference causes interferences to reappear, the I/F profiler can send a repeat offender signal to the I/F mitigation control module 232. The I/F mitigation control module 232 can invoke the same control commands every time the repeat offender interferes. Some interfering communication systems transmit for short time durations over consecutive time periods. When the profiler 236 determines that the interference is active and present, the future periodic interference can be anticipated, and such anticipation can continue until the profiler determines that the interferer or interference is no longer present.

The I/F profiler 236 can utilize a template of timing standards from library 236 to improve the accuracy of predicting future burst transmissions. In accordance with known time division standards and known past start times of previous burst interferences, the I/F profiler 236 can provide an expected time of arrival of the next burst interference to the I/F mitigation control module 232.

The profiler 236 can provide basic timing control information to the I/F mitigation control module 232. The profiler 236 can send information indicating that an interference of a particular duration is occurring on a periodic basis. Additionally, the profiler 236 can indicate when a next burst is expected (possibly in real time) and a time till burst prediction or a predicted time interval between the bursts. As stated above, communication standards dictate the length of a timeslot(s) and the transmit and receive timing and durations.

Accurately determining a start time, burst duration and time period between bursts can allow for improved control commands from the I/F mitigation control module 232. Such control signals can be utilized by higher level functions, where the control of an individual module in the DRS 201 can occur simultaneously with the onset of the interference. A comprehensive library of time domain profiles can increase the possibility that the I/F profiler 236 can match profile data received from the I/F sensors sub system 210 with a protocol standard such as a GSM in the library.

As stated above, the I/F mitigation control module 232 can accept interference related data from a plurality of sensors/sources and accept input from the I/F profiler 236 that further or more accurately defines the interference and its characteristics. The I/F mitigation control module 232 can use all of the inputs to make a decision regarding the best mitigation technique available and generates a specific combination of control signals to alter operation of the DRS 201. For example, the I/F mitigation control module 232 may activate or deactivate a power conservation subsystem, clamp the gain on a VGA, activate components in an interference estimation system, activate components in an interference cancellation system, activate or deactivate an active or standard filtering system, and shut off all interference mitigation systems.

In some embodiments, in response to specific input from the I/F detector sensor module 210 and the profiler 236 the I/F mitigation control module 232 may invoke a recursive interference estimation system, activate all interference mitigation sub-systems, activate or deactivate any number of mitigation sub-systems or other data recovery sub systems, activate time domain or frequency systems and instruct the DRS 201 to change communication frequencies. All of the controls may only be activated or deactivated for a short time period, particularly when interference bursts are detected.

In some embodiments, the I/F mitigation control module 232 can determine that the system 200 is experiencing more than one type of interference and invoke control commands that are mutually exclusive for each type of interference. The disclosed arrangements can select a low complexity, low latency interference mitigation technique. Cancellation techniques generally do not degrade the desired signal so if signal levels are low a cancellation technique can be selected as a tailored interference mitigation solution.

Antenna 202 can represent multiple antennas having different locations. The spatial separation of the antennas and the different communication paths created between the interfering transmitter and the transmitter of the desired signal allows the phase detector 225 to determine different phase relationships between the desired signal and interfering signals at each antenna/receiver. The detected phase differences can be utilized by the I/F estimator 222 to assist in estimating the interference. In some embodiments the phase detector 225 could be part of the I/F detector sensor module 210 and could send data directly to the I/F mitigation control module 232 and the I/F profiler 236.

The spatial separation of the antennas and the different communication paths created between the interfering transmitter and the transmitter of the desired signal can create a phase difference between the interference and desired signals as seen by the antennas of the receiving system. Phase shifters in one or both paths can then be used to adjust the phases so that the phase of the two interfering components is 180 degrees out of phase while the phase of the desired signal components is not 180 degrees out of phase. Linear summation of the two signal paths then allows cancellation of the interference while leaving a virtually unchanged desired signal. However, detecting phase differences requires multiple receiver chains and creates additional inefficiencies such as increased costs and power consumption.

The system can have a first in first out (FIFO) type buffer memory to delay the incoming data until an interference estimate is made by the estimator 222. The buffer will introduce some latency, although such a delay is not significant with respect to the latency permitted by the WLAN protocol. The disclosed arrangements are not limited to any particular wireless protocol or system such as an 802.11 compliant WLAN system, but the disclosed embodiments could be utilized by many other communication systems.

In some embodiments, the system 200 can include a detector that is specific to an interference that causes serious problems. One such example would be a global system for mobile communications (GSM) interference detector. Such a detection system could be specifically designed to detect specific types of interference such as narrow band pulsed interference from a GSM device. The narrow band detection sub system can be connected close to the RF input and can detect interference up stream or prior to packet detection. This specialized detection system can have an electromagnetic spectrum sensing module. The specialized interference detection sub system can have detection components that are tuned or tailored to detect GSM interference. In response to such detection, the specialized subsystem can disallow packet dropping and could disable the PCC or sleep mode sub system when the amount of received energy changes in certain circumstances. Such a specialized detection and control system can avoid restarts and re-synchronization functions caused by falsely determining that power levels are below a specified limit.

In some embodiments, the energy detection system can be deactivated for the duration of a packet once beginning of the incoming packet is detected. It can be appreciated that when the disclosed system receives interference that changes the power level in the receiver by more than a predefined level, the system 300 can be deactivated by a power conservation system and prevent the system from entering a sleep mode, allowing the receiver to detect the wideband data packets that arrive during and subsequent to the interference burst.

The disclosed interference identification/mitigation system 200 could support most wireless technologies including wireless handsets such as cellular devices, or hand held computing devices that utilize WLAN, WMAN, WPAN WiMAX or handheld digital video broadcast systems (DVB-H). The system 200 is also compatible with single antenna or multiple antenna systems such as multiple input multiple output systems (MIMO).

Figure 3:
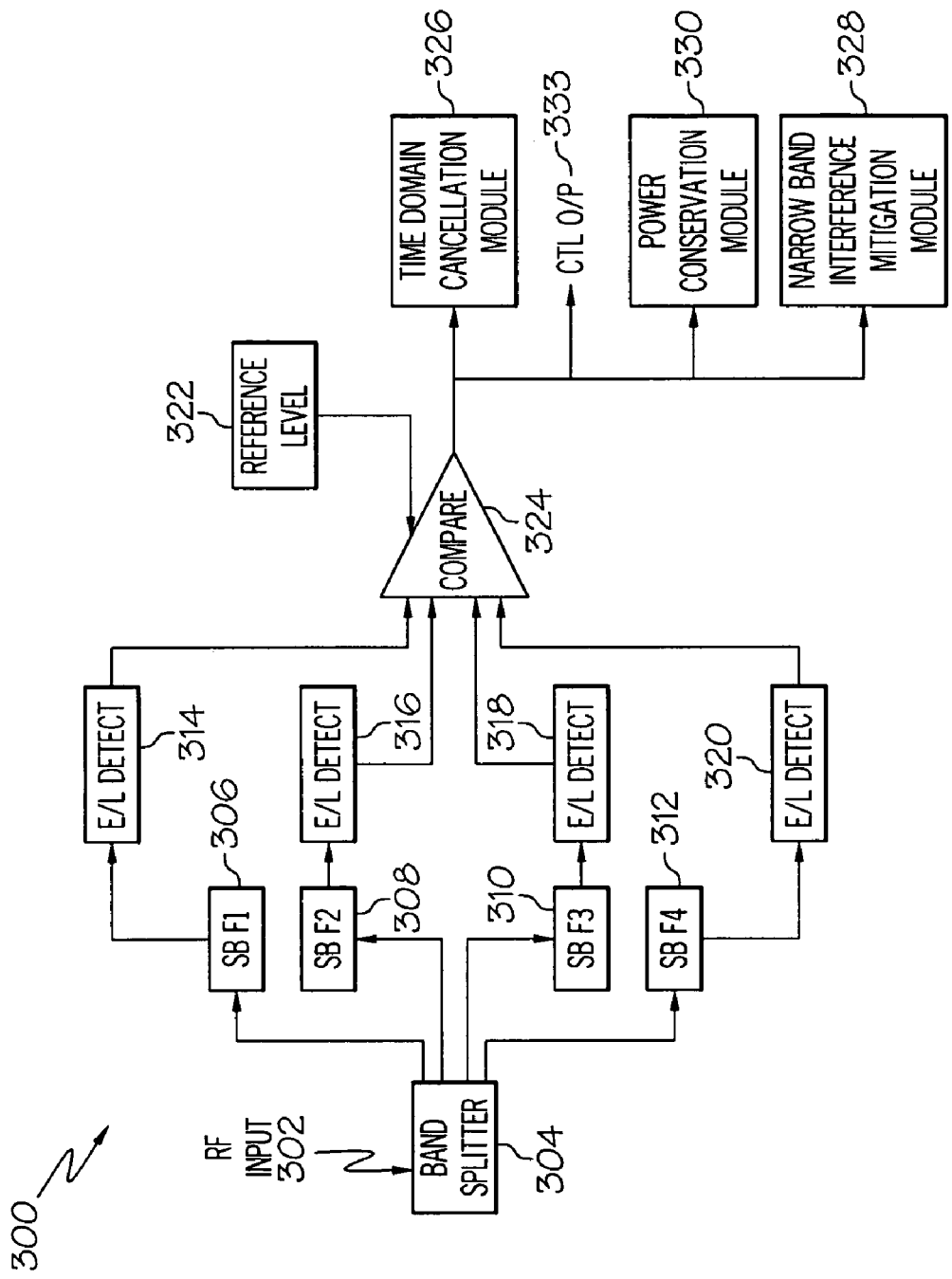
FIG. 3 is a block diagram of an interference detection system.

Referring to FIG. 3, a portion of a narrow band interference detection system 300 is depicted. The sub band detection system 300 could be implemented as the interference bandwidth detector 218 in the system described in FIG. 2. The system 300 can include a sub band divider or band splitter 304, four sub band filters (SBF) 306, 308, 310, and 312, four energy level (E/L) detectors 314, 316, 318, and 320, a compare module 324, a reference level module 322, a time domain cancellation module 326, a power conservation module 330 and a narrow band interference mitigation module 328. The system 300 can also include a control output 333 that can be utilized to control various sub systems.

In operation, the system 300 can accept radio frequency (RF) input 302 utilizing a band splitter 304. The band splitter 304 can divide the electromagnetic energy on the RF input 302 into different paths. In some embodiments, the band splitter 304 can have mixers or parallel conductors that can separate the RF energy into various frequency ranges or sub bands. In some embodiments, the band splitter 304 can be a splitter or a divider that couples the RF input 302 to multiple outputs. In some embodiments, each sub-band signal out of the band splitter can be provided to a band pass filter, such as filters 306,308, 310 and 312.

The filters 306-312 can be designed to reject at least one sub band or to pass at least one sub band. Such a configuration allows the energy in a specific sub band to pass to the output of the filter largely unaltered. The unaltered signal can be utilized as a detection mechanism indicating interference that is occurring in a specific frequency range or sub band. Band pass, band rejection, band limit, notch, T-notch, band elimination and band rejection filters in the proper configuration can be utilized to pass or convey a specific band or sub band of frequencies largely unaltered. However, the filters 306-312 can attenuate electromagnetic energy having frequencies in a specific range to lower energy levels.

When filters 306-312 are implemented as band pass filters, they can be designed with a narrow (small band) of frequencies that do not get attenuated, and all frequencies out of the sub band are significantly attenuated. A filter with a narrow frequency rejection range and a sharp roll off is often referred to as a filter with a high Q factor. Filters 306-312 can have an order of six which is a relatively high order. Generally, the higher the order of the filter, the greater the rate of attenuation as the frequency moves out of the pass band. Alternatively stated, the higher the Q factor the narrower the band pass region and the greater the attenuation of the energy at the filter's "edges" or the edges of the band pass. For example, a filter with an order of six can provide a significant increase in attenuation with a nominal increase in frequency (a steep slope when frequency and attenuation are graphed).

Generally, filters 306-312 can pass the electromagnetic energy of the RF input 302 to their output based on the tuning of the filter and the frequency of the electromagnetic energy applied to the input of the filter. The energy in a specific sub-band that is passed by a filter can be provided to the respective energy level detectors 314-320. Energy level detectors 314-320 can detect the energy level (or a relative energy level) that is present in each sub-band. The energy output from the energy level detectors 314-320 can be provided to the energy level compare module 324. The energy level compare module 324 can compare the energy levels present in each sub-band and obtain relative power level differences for each sub band. When a sub band energy level on the input of the compare module 322 equals or exceeds the trip point set by the reference level, the compare module 324 can assert a signal on its output indicating a relatively high level of noise in the sub band.

In some embodiments, a user can set the value of the reference level 322 trip point to the amount of energy required by a sub-band and can set levels that, when detected between a band and an average energy level, can activate the output signal of the compare module 324. The reference level module 322 can be controlled by a user and thus, the trip levels can be user selectable.

In some embodiments, if the energy level detected for one sub-band (i.e. the output from one detector 314-320) is higher than the energy level in the other three sub-bands by a predetermined threshold value, (as controlled by the reference level 322) the compare module 324 can assert an output signal that indicates that narrowband interference has been detected. In other embodiments, the output signal can be asserted when a sub band contains an energy level that is a predetermined amount greater that the average energy level of all sub bands.

The activated control signal can be utilized to activate a narrowband interference mitigation sub-system such as narrowband interference mitigation module 328. When such a sub-system is activated, modules within the system such as a variable gain amplifier can be controlled or adjusted such that the narrowband interference does not significantly interrupt a communication session.

In some embodiments, the sub band with a high energy level generally indicates that the sub band shares a frequency with a side band of a different communication system. For example, the third harmonic of transmitting GSM devices falls within sub bands of an 802.11 compliant system. The disclosed system 300 can determine with some accuracy, (with the assistance of other detecting sub systems and profiles in a library as illustrated by FIG. 2), the frequency of the interfering signal.

In some embodiments, the received interference on the RF input 302 can have frequencies that are sufficiently broad that the interference will manifest at the output of more than one sub band filter. In other embodiments, the received interference may have a frequency that is on the border between two sub-band frequencies. Such border line frequencies can also manifest at the output of two adjacent sub band filters that pass adjacent frequencies.

When two energy level detectors that are frequency adjacent detect energy levels that are higher than the other energy levels in other detectors by a predetermined threshold level, the compare module 324 can generate a control signal indicating that narrowband interference is present. In some embodiments, the control signal can indicate specifically that two sub bands are experiencing relatively high levels of energy. Some interference mitigation sub systems can utilize the control signals that provide this additional resolution to activate different types of interference mitigation arrangements. It can be appreciated that the different types of interference detection can be utilized to activate different interference mitigation sub-systems. The numerous types of control signals and the numerous types of interference sub-systems and techniques allow the system to tailor a solution based on the characteristics of the interference.

The detection systems disclosed can provide specialized control commands to specialized interference mitigation sub systems. Such a comprehensive detection mitigation system allows a receiver to operate efficiently during high levels of interference. One reason for such efficiency is that an appropriate interference mitigation system can be activated based on one or many characteristics of the interference.

In some embodiments, when the difference in energy levels between one sub band and all other sub bands is less than the threshold value, some or all interference mitigating sub-systems or functions can be deactivated. Such a deactivation can allow for a more robust signal to reach the data recovery portion of the system because filtering and cancelling on low levels of interference can degrade signal quality. Accordingly, different from traditional systems, the detection of narrowband interference by the detection system 300 allows an interference mitigation system to distinguish between an absence of WLAN transmission activity and a situation where narrowband interference is masking WLAN transmissions.

In traditional WLAN systems, masked WLAN transmission would commence a sleep mode for the system. The output of the compare module 324 can deactivate the power conservation module 330 when narrowband interference is detected such that the system will continue receiving and processing data when the system is receiving high levels of interference. In some embodiments, the compare module 324 can determine or estimate a signal to noise ratio, and this ratio can be compared against a predetermined threshold to make high level mitigation decisions.

In other embodiments, time domain based interference can create a pulse at the output of the compare module 324. The time domain cancellation module 326 can detect such a periodic switch at the output of the compare module and generate a control signal indicating that the interference is periodic in nature. Responsive to such detection, the time domain cancellation module 326 can activate one or more time domain cancellation subsystems (not shown).

Further, it can be appreciated that the system 300 can be utilized to make decisions on what kind of interference mitigation to implement. For example, the signal could be utilized to enable or disable various levels of computational interference and cancellation algorithms based on the intensity and type of interference detected by the system. In other embodiments, other interference mitigation sub-systems can be deactivated when they are not providing beneficial results. The disclosed detection system 300 is more economical than traditional systems because only a single signal path (front end) is required to detect interference and the desired signal. Further, only a single down converter and single ADC are required to achieve data recovery.

In the absence of interference and any desired signal, the energy level of each of the sub bands should be relatively equal. However, when narrowband interference is present on one or more of the sub bands, such interference will exhibit a greater energy level on one or more sub-bands. In contrast, in the presence of only the desired signal with minimal interference, each sub-band will exhibit relatively the same energy level. The presence of narrowband interference alone can be readily detected by the disclosed system. The detection of narrowband interference can be utilized to override various energy detection systems that activate power saving systems and can also be utilized to activate and deactivate various interference mitigation systems. In some embodiments, deactivating the energy detector so that subsequent changes to the incoming energy are ignored can facilitate receiver synchronization and packet preamble detection.

The narrowband interference detection system 200 can be implemented with 4 sub-band infinite impulse response rejection filters of order 6. Every filter can have a rejection bandwidth of ¼ of original spectrum, i.e. 5 MHz for a WLAN narrowband detection system. Rejection sub-bands may or may not overlap. The suppression level of each filter can be approximately 40 dB.

Generally, FIG. 3 illustrates a block diagram for possible locations for 306-312 filters in a WLAN processing chain. In another embodiment, an input signal can initially be provided to the four sub-band filters 306-312, and the power levels at the outputs of the four sub-band filters 306-312 can be compared. If one level is relatively lower than the three other filters, this can indicate the presence of narrowband interference. This can be important information for a system that is conducting a synchronization process as such information can be forwarded to the synchronization subsystem. These rejection filters 306-312 can be used for detection and synchronization and for detecting the presence of GSM based and/or other time based interference.

After detection of specific interference types such as GSM type interference is made, one of the filters can have a dual purpose. The filter that has the minimum level at its output can remain on while all other filters are switched off. This minimum level can provide a metric of the signal level available to the receiver. Providing the minimal energy output level to all detection and synchronization units dictates that all detection and synchronization units will be provided with a signal containing only three quarters (¾) of the energy spectrum of the original signal.

The output of the remaining filter will have a narrowband interference that is significantly reduced. It has been shown that the detection and synchronization parts of a WLAN receiver are able to operate with the minimal energy level if the interference to signal ratio is less than 20-25 dB. The detection system 300 can overcome the false detection of an incoming packet caused by interference, and can allow correct packet detection following the onset of narrowband interference. Simulation results show an improvement from twenty percent (20%) correct packet detection to near 100% correct packet detection in the presence of narrowband interference.

Figure 4:
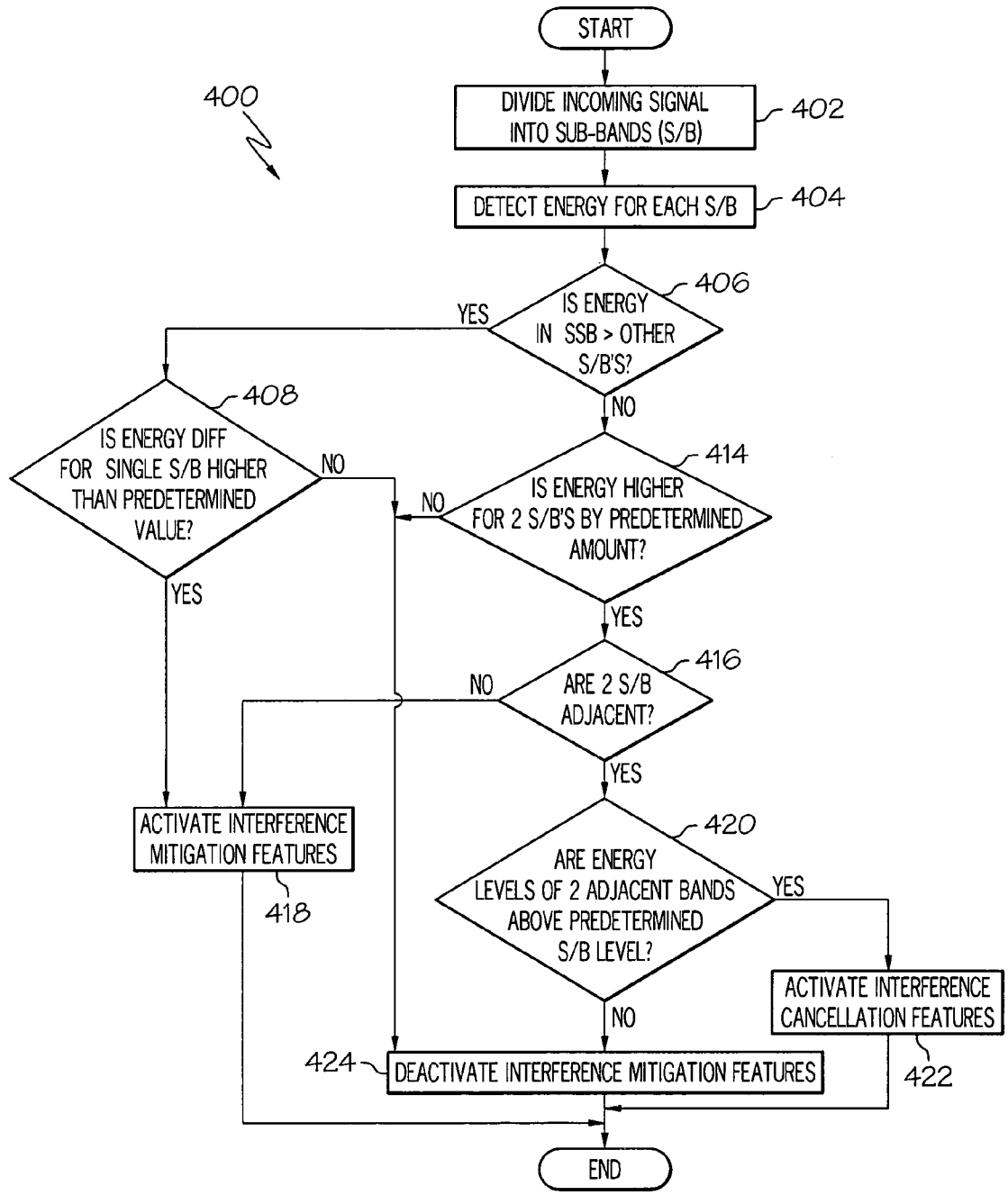
FIG. 4 is a flow diagram depicting a method for detecting and mitigating noise in a data recovery system.

Referring to FIG. 4, a flow diagram 400 illustrating a method for detecting interference, such as narrowband interference is disclosed. The interference detection method 400 could be utilized by the interference bandwidth detector 218 described in FIG. 2. As illustrated by block 402, incoming signals can be divided into sub-bands. As illustrated by block 404, the energy level for each sub-band can be detected. At decision block 406, it can be determined if the energy level of all sub bands is significantly lower than the energy level of a single sub-band.

If the energy levels of all sub bands are substantially lower than the energy level of one sub-band then, as illustrated by decision block 408, it can be determined if the energy of a single sub band is a higher than all other sub bands by a predetermined amount. In some embodiments, the predetermined amount is 3 dB and this predetermined level can be user selectable. If the single sub band has an energy level that is a predetermined amount greater than the other sub bands, interference mitigation features can be activated, as illustrated by block 418. After the interference mitigation is activated the process can end. If, at decision block 408, the energy level of the single sub band is not greater than the energy level of the other sub bands by the predetermined amount, then one or more interference mitigation features can be deactivated, as illustrated by block 424.

Referring back to decision block 406, if either no sub bands or more than one sub bands have high energy levels, then as illustrated by decision block 414, it can be determined if the energy level for two sub bands is higher than all other sub bands by a predetermined amount. In some embodiments, the predetermined amount can be 3 dB. If the energy level in the two sub bands is less than the predetermined amount, then as illustrated by block 424, one or more interference mitigation features can be deactivated due to the lack of interference. Deactivating mitigation features in the absence of interference can allow a data recovery system to operate with lower data error rates.

At decision block 414, if it is determined that the energy level of the two sub bands is higher than the remaining sub bands by a predetermined amount, then as illustrated by decision block 416, it can be determined if the two sub bands with the higher energy levels are assigned to adjacent frequency ranges. If the two sub-bands are not adjacent in frequency range then interference mitigation features can be activated as illustrated by block 418.

If, at decision block 416, it is determined that the two sub-bands with higher energy levels are adjacent, then as illustrated by decision block 420, it can be determined if the energy levels of the two sub bands are higher than the energy level of all remaining bands by a predetermine value. If they are not, then one or more interference mitigation features can be deactivated, as illustrated by block 424. Deactivation of interference mitigation features can increase the efficiency and reliability of a communication system when interference levels are below a certain parameter. Such low levels can be determined by the disclosed sub band energy level detector method.

If the two sub bands with higher energy levels have energy levels above the remaining sub bands by a predetermined value, then interference cancellation functions can be activated as illustrated by block 422. The process can end thereafter. Accordingly, interference mitigation sub-systems can be activated and deactivated base on the magnitude and bandwidth of the interference. Further, cancellation type interference mitigation systems can be activated and deactivated based on the magnitude of narrowband interference.

Figure 5:
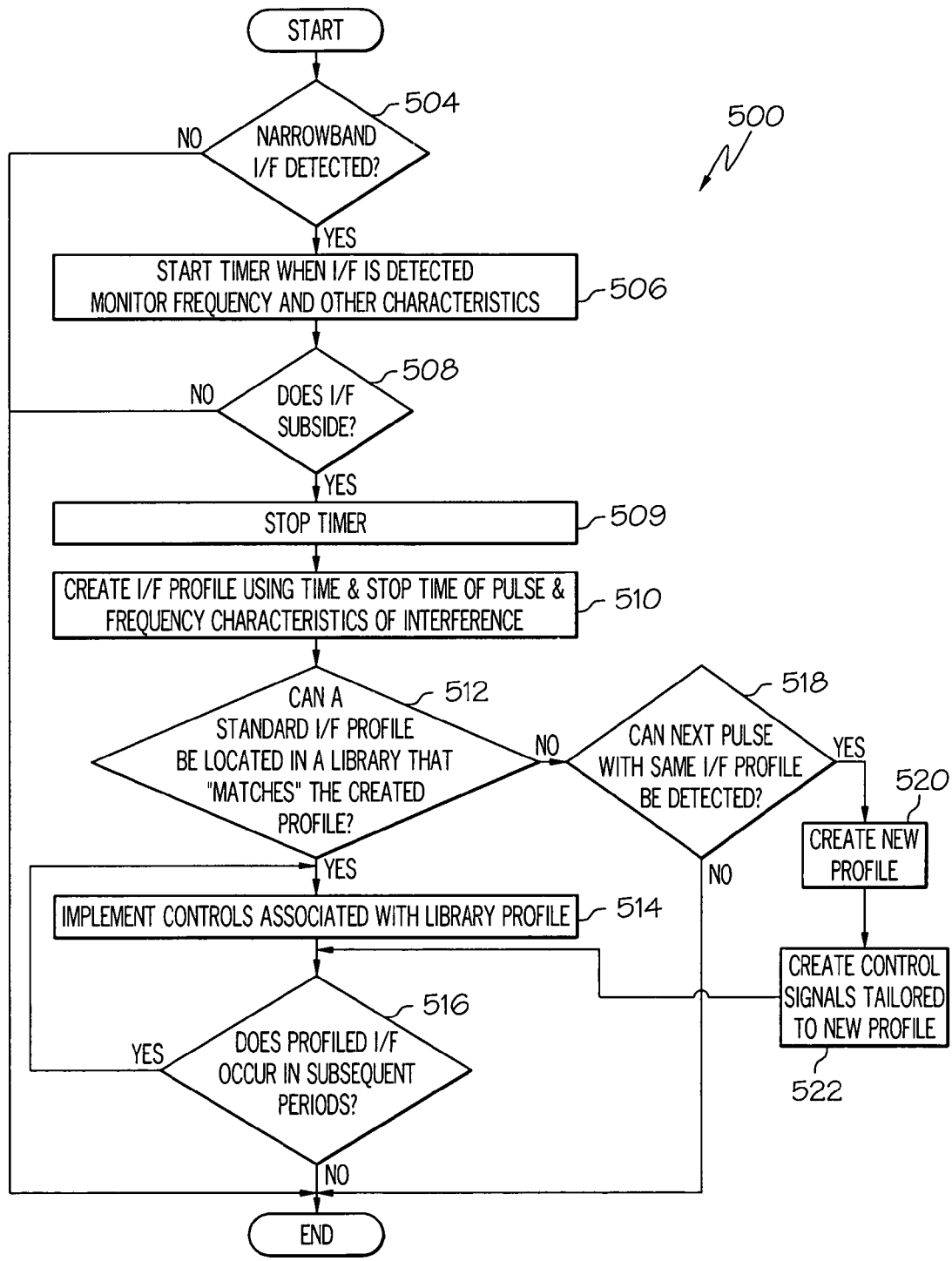
FIG. 5 is a flow diagram depicting another method for detecting and mitigating noise in a data recovery system.

Referring to FIG. 5, a flow diagram 500 illustrating a method for predicting burst interference is depicted. As illustrated by block 504, it can be determined if a predetermined level of narrowband interference has been detected. If the narrowband interference level is less than the predetermined value the process can end. If narrowband interference can be detected that has an energy level that is greater than the predetermined value, then a timer can be started. The timer can be started when the interference is detected or when the interference arrives, as illustrated by block 506. Characteristics of the interference can be detected, monitored and stored by the system.

The system can continue to monitor the interference and at decision block 508 it can be determined if the interference has subsided below a predetermined level. If the interference has not subsided below the predetermined level after a predetermined amount of time, it can be determined that the interference is not burst interference or periodic interference and the process can end.

The narrowband interference detection system can be synchronized to periodic interference using learned and predetermined timing characteristics of burst interference. Thus, the system can sample the interference levels during the transmit period (i.e. a sample period) of the interfering device. Sampling the sub band filter outputs at preset sampling times allows the system to determine whether the periodic interference has subsided or is continuing. The energy sampling system can have a timer. The timer can be set to the cycle time of the transmitter and can be activated when a burst is initially detected. When the timer times out, the timer can send a signal indicating the start of the next interfering signal.

A sampling period can be set for just before the interference is expected and end just after the duration of the transmit pulse. If the interference starts at this time, and the sampling system detects the interference, the interference can be "re-identified" as a known periodic interference. If the interference does not appear during the sampling time or during the expected interval even though suppression of mitigation mechanisms have been activated, the detection system can determine that the interference should not be anticipated anymore.

If at decision block 508 the interference subsides, then as illustrated by block 509 the timer can be stopped. The start time and stop time of the detected interference can dictate the duration of the interfering transmission. Such timing data is accurate and essential to devices utilizing a time domain configuration to communicate. One such common time domain technology is time division multiple access technology (TDMA). As illustrated by block 510, a burst interference profile can be created using the acquired timing data. The acquired timing data can include the start time and the stop time or the duration of the pulse. The acquired data can also include the interference frequency(ies), the magnitude of the interference and other characteristics of the interference.

As illustrated by decision block 512, the burst interference profile can be compared to standard or created profiles in a library or a look up table. The system can create profiles based on past interferences and such learned profiles can be stored with the standard profiles. If the created profile "matches" or has enough similar characteristics to the standard profile, it can be assumed that the interference matches a known profile and comes from a device conforming to a communication standard. This assumption allows the system to acquire additional characteristics about the interference such as when the interference should be expected. A set of control commands can be associated with and stored with the standard profile in the library. If the created profile finds an acceptable match in the library, as illustrated by block 514, periodic interference mitigation control commands can be retrieved from the library and assigned to a profiled interference. Such control commands can be utilized to control the interference mitigation portion of the communication system.

The associated control commands can be tailored to adjust specific functions of the data recovery system such that the system can mitigate the interference. Generally, a device that is transmitting an interfering signal to a data recovery system is transmitting in accordance with a particular communication standard. Applying a standard remedy or standardized control signal to an identified problem can prove an efficient mitigation method. Significant data about the interference can be stored by the data recovery system and such data can be utilized to control interference mitigation in the affected device. For example, the interference frequency, the duration of each transmitted pulse, the cycle time, or burst interval and other data can be located and utilized to mitigate present and future interference.

As illustrated by decision block 516, it can be determined if the profiled interference occurs in subsequent periods in accordance with the assigned control data. If the interference occurs or can be detected in subsequent periods, the control signal can continue to be implemented as the process reiterates to block 514. As illustrated by decision block 516, if the profiled interference cannot be detected in subsequent time periods then the process can end.

Referring back to decision block 512, if the system cannot find an interference profile that sufficiently matches a profile in the library, then as illustrated in decision block 518, it can be determined if a subsequent interfering pulse with the same or a similar profile can be detected. If a subsequent pulsed interference with a similar profile cannot be detected the process can end. If a subsequent pulse with the same or similar characteristics or profile can be detected, as illustrated by block 520, a new profile can be stored in the library. The profile can include a start time, duration, a stop time, a period, a frequency and a magnitude. As illustrated by block 522, control signals can be created that are tailored to mitigate interference problems associated with the narrowband burst interference that was profiled. As illustrated by decision block 516, as long as the interference is present in consecutive time periods the control signal in the library can be applied as the method iterates to block 514. When the interference subsides the process can end.

Figure 6:
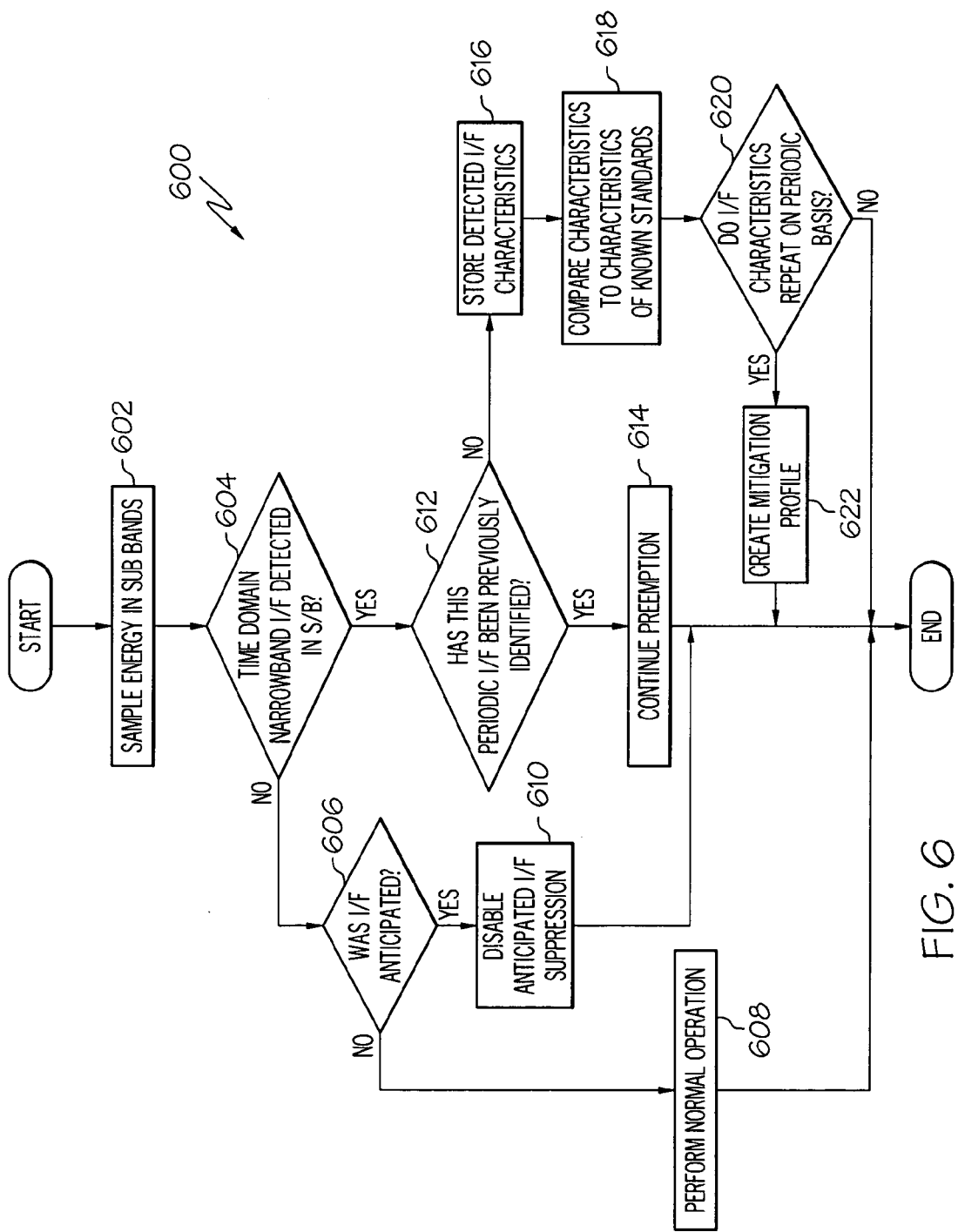
FIG. 6 is a flow diagram illustrating yet another method for mitigating interference.

Referring to FIG. 6, a flow diagram 600 illustrating a method for detecting timing parameters of burst interference is illustrated. Typical time domain based transmissions create burst interference or periodic interference to other devices. Such burst interferences typically have a predictable burst duration and cycle time, based on the frame length and time allocation for the device. The disclosed method can acquire parameters of narrowband interference and can send a signal to an interference mitigation system based on the results of interference sampling intervals. When the sampling intervals continue to detect bursts of interference, the system can assume that there will be interference during a future transmission time slot.

As illustrated by block 602, the environment can be sampled to determine levels of interference in numerous sub bands. At decision block 604 burst interference can be expected and it can be determined if time domain narrowband interference above a predetermined level is detected in a sub band. If the time domain narrowband interference is not detected it can be determined if such interference was anticipated based on prior interference, as illustrated by decision block 606.

If the interference was not anticipated, the system can operate normally, as illustrated in block 608. The process can end thereafter. If at decision block 606 the detected interference was anticipated, the anticipation features of the system can be disabled as illustrated by block 610. The process can end thereafter.

Referring back to decision block 604, if time domain narrowband interference is detected in a sub band then, as illustrated in decision block 612, it can be determined if the periodic interference has been previously identified. A timer can be utilized to detect time intervals between interference bursts and to predict a start of the next burst interference. If the interference starts at the predicted time in block 604, it might be identified as the periodic interference that has occurred in the past as in decision block 612. If the interference does not appear at the time expected as in block 606, the method can indicate that the interference has subsided and should not be anticipated in the future by disabling the interference anticipation features.

If the interference has been previously identified, preemptive interference mitigation can continue as illustrated by block 614. The preemption can be a periodic signal that maintains a particular gain setting for variable gain amplified during a burst of interference. Such control can keep a receiver in a dynamic operating range in the presence of periodic narrowband interference. Such a preemptive signal can be asserted throughout the period of the interference and possibly throughout packet reception. Scheduled interference mitigation can be a preemption process. Previously identified interference can have interference levels, a period, duration, start times and end times of the interference so that the preemptive mitigation can be started and ended at correct times while providing the appropriate interference mitigation levels.

The process can end thereafter. Referring back to decision block 612, if the interference has not been previously identified then, as illustrated by block 616, the characteristics of the interference can be stored. As illustrated by block 618, the parameters can be compared to parameters resulting from known communication standards.

As illustrated by decision block 620, if the interference does not repeat on a periodic basis the process can end. If the interference repeats on a periodic basis, an interference mitigation control profile 622 that can include control characteristics, can be created, stored and retrieved to control a data recovery system during future periodic interference. The process can end thereafter.

In some embodiments, system memory can provide a library of pre-loaded interference profiles where the profiles represent specific types of known interference. In some embodiments, the library can be loaded with such interference profiles as the system learns different reoccurring patterns from devices from a particular manufacturer. The interference characteristics and patterns can also be acquired from devices that operate according to a particular communication standard. Thus, the digital samples acquired by the sampling module or an output of an ADC and the digital samples can be compared to a library of samples. After comparing a "match" or similarities between the detected interference and a known or past interference, an interference signature can be made. As a result of the match, a tailored control signal can be located and sent to an interference mitigation sub system such as a power conservation controller, an interference mitigation module or a frequency domain processing system. The control signals that are selected can be based on the success of previous mitigation techniques.

Comparing a stored signature to a detected signature can be time sensitive, as the data points representing amplitude, phase, etc. and their relative timing can be compared to stored interference signatures. Generally, an interfering device will have an interference profile signature both in timing and in digital value and this profile will produce a percentage of data points that will be the same for each interfering transmission from the interfering device. Thus, the signature can provide points that can be compared to previously stored timing based data points.

In some embodiments, the sampling module can empirically determine an interference signature of a transmitting device. The signature can have a start time, duration, a duty cycle and periodicity among other things. Comprehensive interference detection and control signals tailored to such accurate detection can have a single receive path and can provide high data throughput in the presence of narrowband interference and narrowband burst interference.

Figure 7:
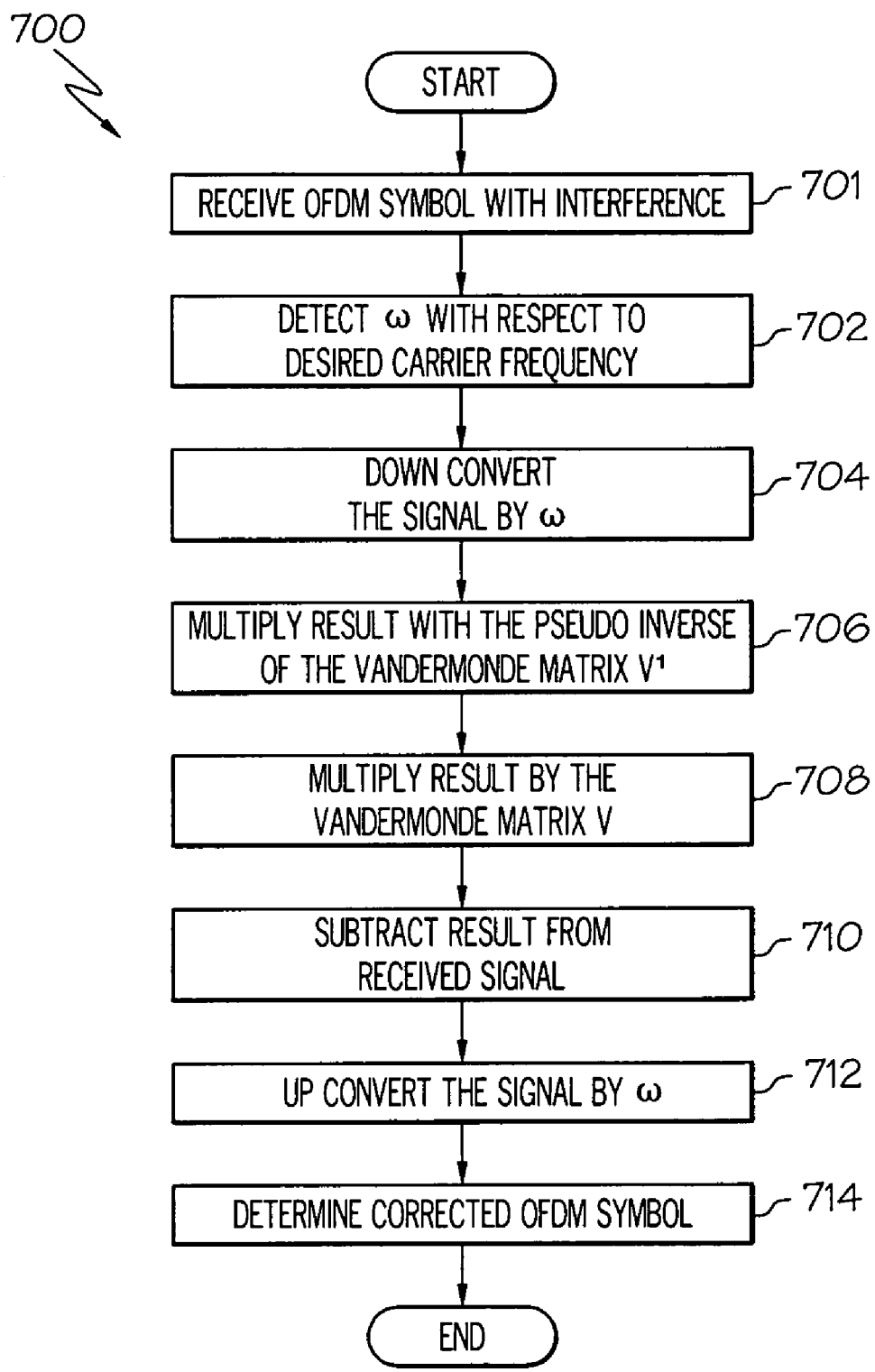
FIG. 7 is a flow diagram depicting a method for cancelling interference

Referring generally to FIG. 7 a time domain interference cancellations method is disclosed. As a result of the increasingly crowded frequency spectrum, it is not unusual for communications systems to receive interference from another man made communication device. As stated above, a challenging situation occurs when interference is received by a wideband WLAN receiver due to the emission of a third harmonic of a nearby GSM compatible cell phone. One or more frequencies of a transmitting GSM compatible device have a relatively high power level and fall within the band of frequencies utilized by the victim receiver. This interference cannot be effectively removed utilizing filtering techniques because the desired signal can be adversely affected by filtering.

In accordance with the description of FIG. 7 an alternative method is disclosed that performs interference cancellation in which an inverted "replica" or estimation of the interference is added to the signal received by the victim receiver. If the inverted signal is exactly matched in amplitude and is opposite in phase with that of the interference received, then the interference can be almost "completely" cancelled without affecting the integrity of the desired signal. The replica of the desired signal can, in some cases be derived by focusing on receiving signals from the interfering transmitter and quantifying these signals. Accurate sampling is possible if the aggressor and the victim are located on the same platform.

Another alternative cancellation technique utilizes multiple antennas and receive paths. The spatial separation of the antennas and the different communication paths can be utilized to determine different phase relationships between the desired signal and interfering signals at each antenna/receiver. These phase difference can be utilized to cancel the interference signal with only minor change to the desired signal. This technique which requires multiple antennas and receive paths is less efficient that the technique disclosed by FIG. 7 because of the increased costs and power consumption associated with such techniques.

In yet another traditional interference cancellation method a WLAN receiver can be designed with a sufficient dynamic range such that a "perfect" or accurate representation of the interference signal can be derived and then utilized to cancel the interference component of the received signal. However, practical considerations such as circuit board area, cost and power consumption limit the dynamic range of most receiver designs. FIG. 7 below describes a number of techniques that can be applied by a receiver to enhance the performance of the interference cancellation embodiments.

The method described with reference to FIG. 7 generates a mathematical equation that is a "replica" or an estimation of the interference signal can prove more economical for extracting a desired signal from a noise filled environment. Unlike noise interference from most man made sources interference from communications systems can be defined in the time domain by relatively simple mathematical expressions such as a polynomial. An interference estimate provided by a polynomial can be obtained by solving a set of simultaneous equations where the equations can be derived from a plurality of series or time samples of the interference waveform.

FIG. 7, is a flow diagram 700 describing a method that can estimate the interference portion of a received signal, subtract the interference portion from the received signal and provide a data signal that has greatly reduced interference levels to a data recovery system. Although the disclosed embodiment describes processing a single OFDM symbol, the teaching herein could be utilized to mitigate interference for any wideband time domain signal. In addition, processing a single symbol is disclosed however, numerous symbols could be processed simultaneously utilizing the described features.

The disclosed method utilizes the tendency that narrowband interference has a much higher energy level than the level of the desired signal. Thus the interference is easy to detect and process. High levels of "in band" interference can seriously degrade the performance of broadband communications systems. While filtering techniques can be used to remove some interference, filtering can cause a loss of signal and loss of data. This occurs because filtering removes part of the desired signal. Cancellation techniques can overcome the limitation of filtering but require an accurate replication of the interference so that the interference replication can be subtracted from the received signal to provide a desired data laden signal with a low level of interference. The method described by FIG. 7 can estimate the narrowband interference in the time domain.

As illustrated by block 701, an OFDM signal with interference can be received. As illustrated by block 702, the difference frequency ($\omega$) between interference carrier frequency and the OFDM symbol frequency (the desired signal) can be determined. The received signal can be down converted utilizing the difference frequency ($\omega$), as illustrated by block 704. In some embodiments, the desired signal can be filtered from the received signal to isolate the interfering signal and provide sampled data points that represent a more accurate representation of the interfering portion of the signal than solely with the received signal. The disclosed method is not limited to OFDM symbols and could be utilized for narrow band interference cancellation for any wideband receiver. The digital data can be sampled and the estimation can be made such that the higher frequency component of the desired signal is ignored and the lower frequency of the interfering signal can become more pronounced. The results of the down conversion can be multiplied by a pseudo inverse of a Vandermonde matrix, as illustrated by block 706.

The digital data points representing the received interference can be utilized to estimate the interference. In some embodiments a fourth order polynomial equation such as ... $At^4+Bt^3+Ct^2+Dt+E$ can be utilized. The parameters A, B, C, D, and E can be estimated/determined using many different interpolation techniques such as a least squares technique that attempts to minimize the sum of the squares of the distances between the data points that are utilized to create the curve and such an interpolation technique generally "connects" the distribution of data points with an equation describing a line. One such technique is to utilize a Vandermonde matrix to perform a least squares approximation on the sample data. Stated in an alternate way, the Vandermonde matrix can yield a polynomial equation having a least squares fitting to reconstruct the interference waveform from the distribution of the data points.

It can be appreciated that there can be a tradeoff between having a "perfect fit" requiring a significant number of computations and creating a smooth well-behaved function or line with a sufficient accuracy and a nominal amount of computations. It has been determined that a fourth order polynomial can provide adequate accuracy with a manageable number of computations. However, a fourth order polynomial is not a limiting factor as higher and lower orders could be utilized without departing from the scope of the present disclosure. When utilizing a fourth order polynomial to estimate the interference being received by an 802.11 compliant WLAN, the size of the Vandermonde matrix is 64×5.

Generally, the more data points available for the interpolation, the higher the degree of the polynomial that can be utilized and the greater oscillations the estimation or function will exhibit between the data points. Therefore, a high-degree interpolation may be a poor predictor of the function between points, although the accuracy at the data points can be "perfect." The least squares approximation can sample the interference frequency and convert the interference frequency to a very low frequency. Such a transfer provides a smooth function that is fitted to the received signal (i.e. data plus interference). The fitted signal will indicate that the interference has a much lower frequency than the modulated data. The modulated data will have a rapidly changing signal level with a much lower amplitude than the interference.

The Vandermonde matrix is a matrix with the monomial terms of a geometric progression in each row. The Vandermonde matrix is useful in polynomial interpolation or a mathematical formula to calculate values between two data values. A Vandermonde matrix generally solves a system of linear equations to find the coefficients of the polynomial where the polynomial describes the data. The Vandermonde matrix can be expressed as follows where t represents time:

$$V = \begin{bmatrix} 1 & t_1 & t_1^2 & t_1^3 & t_1^4 \\ 1 & t_2 & t_2^2 & t_2^3 & t_2^4 \\ 1 & t_3 & t_3^2 & t_3^3 & t_3^4 \\ \cdots & \cdots & \cdots & \cdots & \cdots \\ 1 & t_N & t_N^2 & t_N^3 & t_N^4 \end{bmatrix},$$

and the vector for the noise component "p" can be expressed with polynomial coefficients as follows:

$$p = \begin{bmatrix} E \\ D \\ C \\ B \\ A \end{bmatrix}, \text{ and}$$

and the data vector "y" containing the OFDM symbol can be described as $$y = \begin{bmatrix} y_1 \\ y_2 \\ y_3 \\ \cdots \\ y_N \end{bmatrix}.$$

An inverse or pseudo inverse of the Vandermonde matrix V' can be determined. The pseudo inverse of the Vandermonde matrix can have some properties of the inverse matrix but not necessarily all of the properties. The interference can be estimated utilizing a least squares approach by multiplying the data vector, y, by the pseudo inverse of the Vandermonde matrix V', such that p=V'(y), as illustrated by block 706. It can be appreciated that the Vandermonde matrix V will be the same for each OFDM symbol and thus, the inverse of the Vandermonde matrix only needs to be calculated once.

Accordingly, the resulting interference vector "p" as calculated in block 706 can be utilized to estimate of the interference by executing the equation y=(V)p or by multiplying the Vandermonde matrix to the signal vector component, as illustrated by block 708. Accordingly, the noise component vector "p" as determined by the digitized data can be multiplied by the Vandermonde matrix to provide the desired signal "y" where V(p)=y.

The interference estimate can then be subtracted from the OFDM symbol to create a corrected OFDM signal. Thus, the estimated interference result of block 708 can be subtracted from the received signal as illustrated by block 710. The received signal can be digitized and stored in a first in first out buffer and thus can be delayed while the interference cancellation equation is generated and the interference is cancelled. After subtracting the estimated noise from the actual signal a signal with insignificant interference can be provided for data recovery. The result can be up converted by the difference frequency, as illustrated by block 712. After up conversion the symbol can be extracted from the processed input symbol, as illustrated by block 714. In the case of the WLAN receiver, the interference can be estimated for each channel or for each orthogonal frequency division multiplexing (OFDM) symbol. Accordingly, the interference for each OFDM symbol or each channel can be cancelled in a parallel process. The process can end thereafter.

In accordance with the present disclosure, the arrangements disclosed herein can utilize time domain cancellation techniques when high levels of interference are present in a receiver. Such time domain cancellation can be performed without requiring cross modulation of the noise signal with the signal having the noise and the desired signal. Thus, the disclosed time domain cancellation techniques can avoid problems associated with transforming the incoming signal into the frequency domain.

The disclosed time domain cancellation can acquire a replication (with a specific degree of accuracy) of the received interference and subtract this replication of the interference from the received signal which has the combined signal of interference and the desired signal. At low interference to signal ratios, such time domain cancellation may be unnecessary. This is because correct demodulation of the desired low interference signal may be possible without requiring a subtraction of the noise component. The disclosed arrangements can be considered as a blind time domain cancellation technique. Such a blind technique can utilize a noise detector that can activate and deactivate noise suppression or noise cancellation features Simulations for GSM 3 rd harmonic interference power having a magnitude of between 1-28 dB larger than WLAN signal power and carrier frequency 3-7.8 MHz larger than the WLAN carrier frequency was performed using the time domain mitigation algorithm with the polynomial approximation of the interference. The interference mitigation system was able to correct the cyclic redundancy check (CRC) of the WLAN packets even when the interference power level was 26-28 dB greater than the desired signal.

Figure 8:
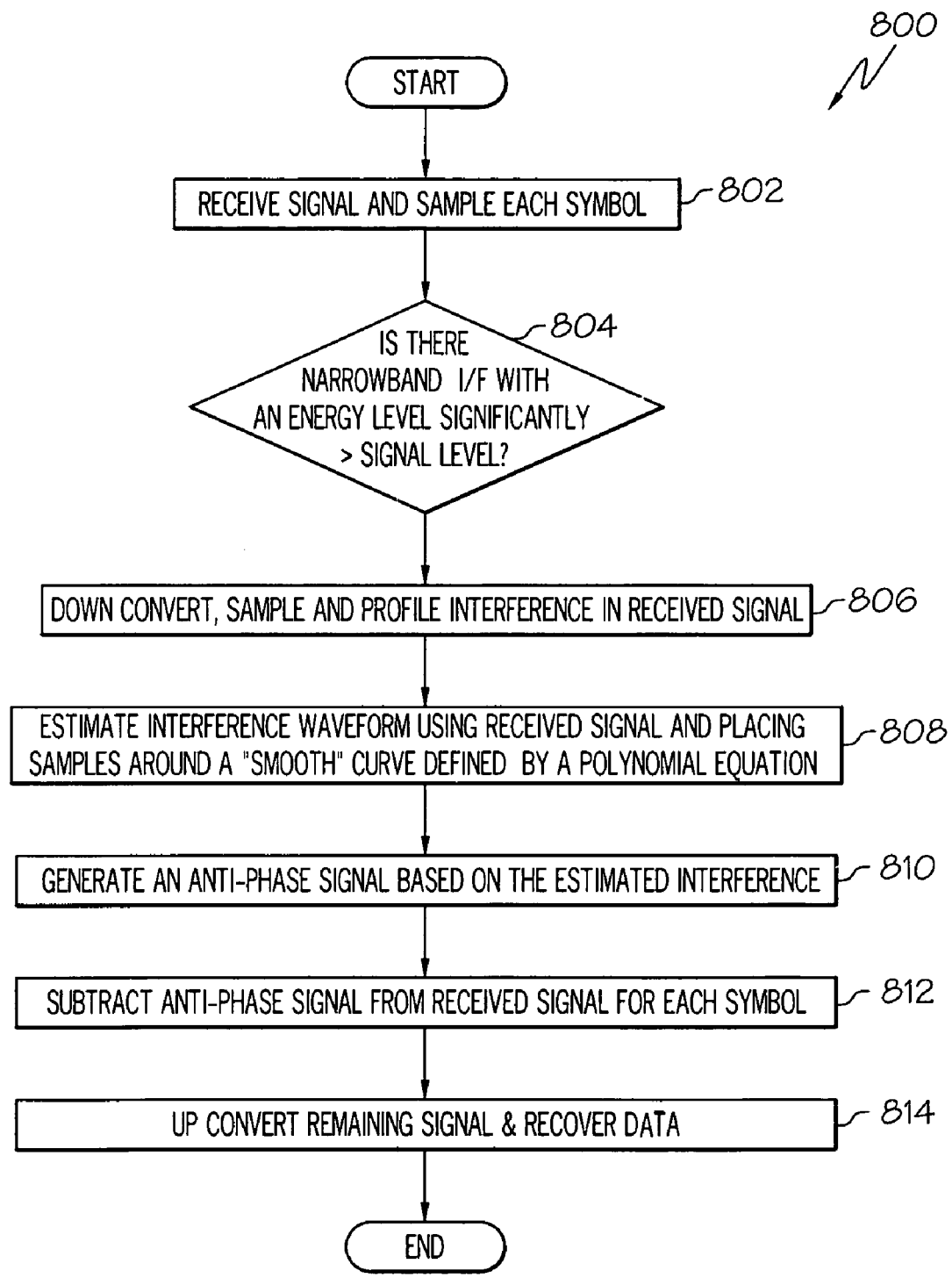
FIG. 8 is a flow diagram illustrating another method for cancelling interference.

Referring to FIG. 8, a flow diagram 800 illustrating a method for cancelling interference is depicted. The method can receive a signal and sample each symbol as illustrated by block 802. As illustrated by decision block 804, it can be determined if narrowband interference exists in the received signal that has an energy level that is significantly greater than the desired signal. If there is not, the process can end. However, if narrowband interference is present with energy levels that are significantly higher than the signal level, the received signal component or signal vector component can be down converted, as illustrated by block 806.

As illustrated by block 808, an estimate of the interference can be made by generating a polynomial equation where a smooth curve is generated based on data samples of the received signals. Such a configuration is illustrated graphically in FIG. 9. The equation can be "transferred" to mathematically create a frequency that is magnitudes lower than the signaling frequencies, the frequency (ies) that carry the desired signal or the signal vector component. Thus, the equation can describe a smooth function or linear function that is fitted to an area occupied by the average values created by a digitized version of the received signal. The received signal would include the data vector component portion of the signal and the interference component of the signal.

The interference estimate equation or fitted equation generally represents the interference portion of the received signal because the data portion of the signal is a rapidly changing signal and has a significantly lower amplitude than the interference portion of the signal. Thus, an equation that represents the data would have relatively constant amplitude and a much higher frequency than the equation describing the interference. From the lower frequency smooth signal an anti-phase signal can be generated, as illustrated by block 810. As illustrated by block 812, the anti-phase signal can be subtracted from the received signal for each symbol. As illustrated by block 814, the results of the subtraction can be up converted and data can be recovered from the resulting signal. The process can end thereafter.

Figure 9:
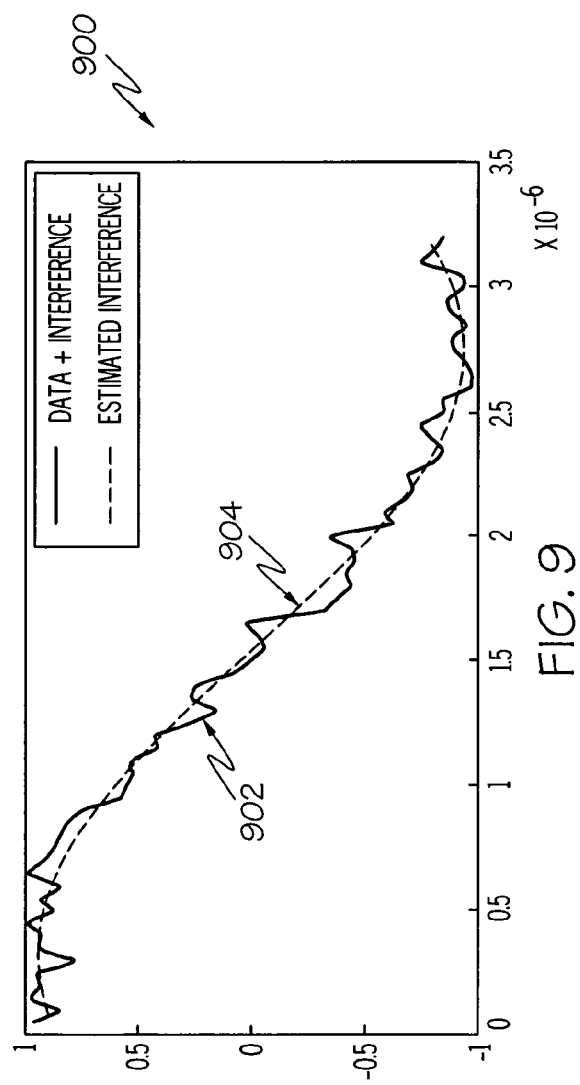
FIG. 9 is a graph of a received signal and interference estimation.

Referring to FIG. 9, a graph with two sampled functions 902 and 904 is depicted. Function 902 frequently oscillates high and low around a lower frequency function 904. The lower frequency function starts at the upper left of the graph at a high value and ends in the lower right corner of the graph as a low value. Function 902 represents an example of a possible OFDM symbol or signal component with an interference component. Function 904 represents an example of an interfering component of a received signal. The graph illustrates where the interfering component 904 has been estimated utilizing digitized data from the received signal and a least squares estimation using a fourth order polynomial equation and the Vandermonde matrixes as describe above. Note the slow frequency or slope of the noise and the higher frequency of the data.

Interference from a GSM based 3 rd harmonic interference having a carrier frequency from three to approximately eight MHz larger than the nominal WLAN carrier frequencies and power levels from one to twenty eight decibels larger than nominal WLAN signal power was simulated. The disclosed time domain interference mitigation arrangements were able to correct the data errors of the WLAN packets when the interference level was between 26-28 dB above the signal level. Such levels depended on the interference carrier frequency when a fourth order polynomial was used to estimate the interference.

It can be appreciated that the noise estimation method described in FIG. 9 is computationally simple compared with many other interference cancellation techniques. Further, because the disclosed method only utilizes a single receive path to receive and process the desired signal, only a single front end receiver is required.

Figure 10:
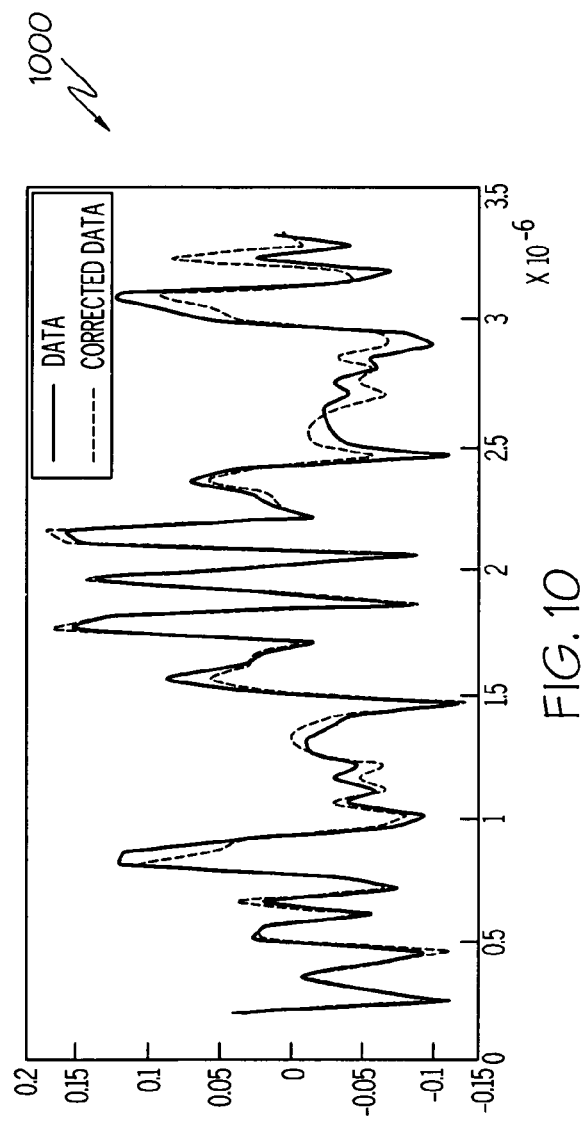
FIG. 10 is a graph of a received signal where the interference has been subtracted from the received signal.

FIG. 10 is a graph of a waveform of the desired signal or an interference mitigated signal after the interference has been subtracted from the received signal utilizing the estimated interference equation resulting in an improved or corrected OFDM symbol. Thus, the higher frequency component of function 902 that oscillates above and below the lower frequency component of interference in FIG. 9 is easier for a data recovery system to process without errors. It should be noted that the scale on FIG. 9 has increments that are over four times greater than the scale utilized in FIG. 10 and that the signal swing of the un-canceled signal is much greater than the signal swing of the desired signal when interference is present.

Figure 11:
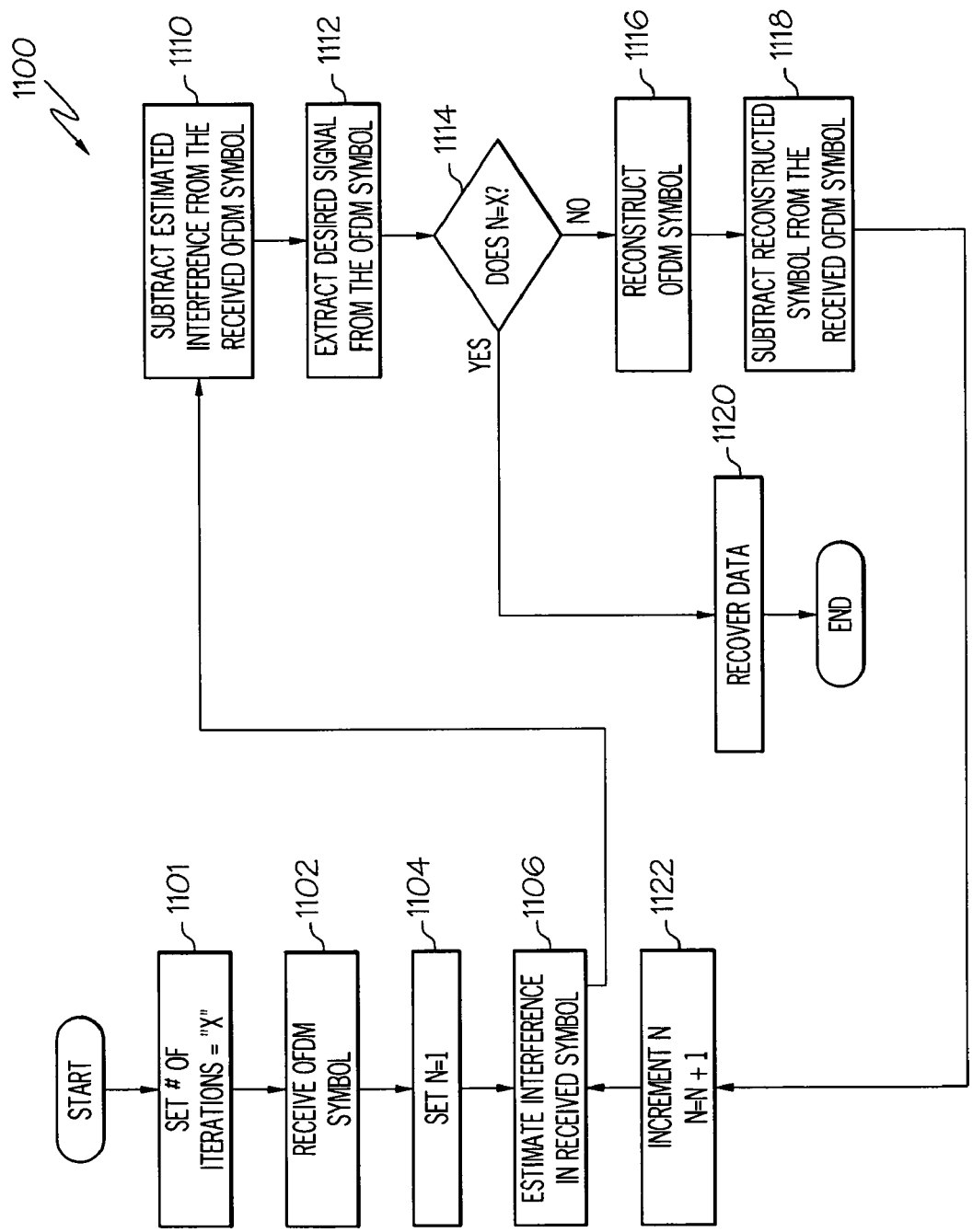
FIG. 11 is a flow diagram depicting yet another method for cancelling interference

Referring to FIG. 11, a flow diagram 1100 depicting an iterative method for estimating interference is disclosed. In some embodiments, time domain narrowband interference can be detected and a polynomial equation estimating the noise component can be utilized in a subtraction process to cancel the noise signal. The equation can be generated using a recursive estimation process where the error that results in the interference mitigated signal can be utilized in the next iteration to reduce the error in the estimation.

As illustrated by block 1101, during an initialization process, the number of desired iterations can be selected by assigning the number of iterations desired, X to N, as N=X. Generally, the larger the number of iterations, the higher the quality of the interference mitigated signal, however the larger the latency. As illustrated by block 1102, an OFDM symbol can be received. As illustrated by block 1104, the iteration counter N can be set to one as the first iteration is occurring. As illustrated by block 1106, the interference in the received signal can be estimated using a least squares method to create a polynomial equation as described above with reference to FIG. 8.

As illustrated by block 1110, the estimated interference can be subtracted from the received signal or the received OFDM symbol. An interference mitigated signal containing the desired signal can result. The desired signal can be extracted from the noise reduced OFDM symbol, as illustrated by block 1112. As illustrated by decision block 1114, it can be determined if the number of iterations is equal to number of desired iterations or if the error is less than a predetermined amount. If the system has reached the desired number of iterations or the error is sufficiently low, the data can be recovered from the interference mitigated signal as illustrated by block 1120.

As illustrated by block 1114, if the system has not iterated the desired number of times, or the error is not below a predetermined level the OFDM symbol can be reconstructed by adding the extracted desired signal to the interference estimation, as illustrated by block 1116. The reconstructed signal can be subtracted from the received signal to provide an indication regarding the inaccuracy of the estimate as illustrated by block 1118. The result of such a subtraction can yield the interference mitigate/desired signal and the interference portion of the signal that was not cancelled out by the estimated interference equation.

As illustrated by block 1122, the iteration counter can be incremented. As illustrated by block 1106, analyzing the data representing the interference mitigated signal, the received signal and the estimated interference component, the interference that has not been properly estimated and cancelled can be determined. The system can again estimate the interference using originally received data, estimated interference data and data regarding interference that was not accurately/appropriately estimated as provided at block 1118. The process can end when the desired iterations or the desired error level have been achieved at block 1114.

Traditional systems replicate an interference signal that is obtained from a cross connected copy of the interference signal or by means of two or more independent paths so that an actual copy of the interference is subtracted from the desired signal. The disclosed methods provide a blind but accurate derivation of a replica of the interference without the use of a cross connects or duplicate path. In this case, a time domain estimate of the interference is desired since it avoids the cross modulation problems associated with transforming to the frequency domain.

The calculated estimate is a desired solution when the interfering signal levels of concern are greater than the level of the desired signal by a predetermined amount. This condition can be checked first and when the interference energy level is higher than the desired signal level, the received signal can be sampled and the disclosed methods can provide an equation that fits the interference function over the sampling period. By sampling the combined desired signal and interference it is economical to estimate the narrowband waveform that constitutes the interference. The estimated interference can then be utilized to generate an anti phase with respect to the incoming signal and combined with a delayed version of the combined signal. Thus, adding these waveforms can effectively cancel the interference.

To achieve an improved desired signal the accuracy of the interference estimation can be improved. In some embodiments, the interference estimation or replication can utilize an iterative process or a recursive process where the estimation can become more accurate with each iteration. The number of iterations can be limited by latency requirements, however only a few iterations are required to achieve the desired accuracy. Such an iterative process is referred to as a turbo-cancellation method herein.

When the received interference is at low levels, the estimation method described above can be less than perfect. The described iterative process allows interference to be more accurately estimated even when the interference is at these relatively low levels. However, even at high interference levels, the turbo-cancellation method described can provide a more accurate interference estimate, thus allowing the system to extract an accurate version of the desired signal. The disclosed iterative process allows for a less complex system to generate the interference estimate.

The turbo-cancellation method can extend the time domain cancellation techniques described above by continually improving the accuracy of an equation that estimates the incoming interference. Such arrangements can utilize an iterative "turbo technique" to obtain a more accurate estimation and cancellation of the interference using two or more stages of estimation and cancellation. Generally, the more accurate the estimation the better data recovery or the lower the error rate.

The disclosed time domain cancellation arrangements can provide a very accurate replication (estimation) of the interference. Such an accurate signal can then be subtracted from the received signal (i.e. the combined interference plus desired signal). In some embodiments, the estimation is more accurate when there is a high level of interference or there is a relatively low signal to noise ratio.

It can be appreciated that there is a trade-off between the time required for the interference estimation to iterate using the turbo approach and overall performance. Using the iterative turbo approach the interference can be estimated more accurately and/or the complexity of the estimation can be decreased. For example, the iterative turbo approach allows implementation of the time domain cancellation using lower order polynomials than required for a single stage estimator/canceller and, subject to adequate range being available in the ADC, allows cancellation of signals at a greater interference to signal ratio. However, the iteration takes more time than single step interference estimation and can increase latency. Thus, there is a cost/benefit tradeoff for such an iterative process.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present disclosure, represent embodiments of the present disclosure.

The disclosed embodiments can take the form of an entirely hardware embodiment, an entirely software embodiment or an embodiment containing both hardware and software elements. In some embodiments, the methods disclosed can be implemented in software, which includes but is not limited to firmware, resident software, microcode, etc. Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

System components can retrieve instructions from an electronic storage medium. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the disclosure contemplates methods, systems, and media that can provide the above mentioned features. It is understood that the form of the embodiments shown and described in the detailed description and the drawings are to be taken merely as possibly ways to build and utilize the disclosed teachings. It is intended that the following claims be interpreted broadly to embrace all the variations of the example embodiments disclosed.

What is claimed is:
1. A method comprising;
receiving a signal, the signal having a data vector component and an interfering component;
creating a first set of digitized data that represents at least a portion of the interfering component;
generating a polynomial equation that is related to the first set of digitized data;
generating a second set of digitized data that represents a data vector component of the received signal;
subtracting an estimate of the portion of the interfering component based on the polynomial equation from the signal to cancel at least the portion of the interfering component to provide an interference mitigated signal representing the data vector component;
determining an error in the interference mitigated signal;

recalculating the interference mitigated signal utilizing the error; and performing data recovery on the recalculated interference mitigated signal.

2. The method of claim 1, wherein recalculating comprises altering the polynomial equation utilizing the error.

3. The method of claim 1, wherein recalculating comprises altering the first set of digitized data based on the error.

4. The method of claim 3, further comprising incrementing a counter based on recalculating the interference mitigated signal.

5. The method of claim 4, further comprising storing a number and if the counter reaches the number, ceasing a recalculation process.

6. The method of claim 1, wherein creating the first set of digitized data comprises filtering the data vector component from the signal.

7. The method of claim 1, further comprising down converting the received signal based on a difference frequency based on a carrier frequency related to the data vector component and a carrier frequency related to the interfering component to create a down converter component.

8. The method of claim 1, wherein generating the polynomial equation comprises a least squares calculation on the first set of digitized data.

9. The method of claim 8, wherein the least squares calculation comprises creating one of an inverse or a pseudo inverse Vandermonde matrix and multiplying the pseudo inverse or the inverse Vandermonde matrix by the data vector component to create the polynomial equation.

10. The method of claim 8, further comprising inverting the phase of the polynomial equations to create an anti-phase equation.

11. The method of claim 1, further comprising up converting the interference mitigated signal.

12. A system comprising:
a data vector module to detect a data vector from a received transmission;
a polynomial generator module coupled to the data vector module to generate a polynomial equation representing interference in the received transmission;
a subtraction module to subtract an estimate of at least a portion of the interference based on the polynomial equation from the received transmission and to provide an interference mitigated signal;
a recalculation module to determine an error in the interference mitigated signal and to recalculate the interference mitigated signal; and
a data recovery module comprises hardware coupled to the subtraction module to recover data from the recalculated interference mitigated signal.

13. The system of claim 12, further comprising a phase inverter to invert the phase of the polynomial equation to facilitate the subtraction.

14. The system of claim 12, wherein the polynomial generator further comprising a least squares module to utilize a Vandermonde matrix and a pseudo-inverse Vandermonde matrix and the data vector to estimate the polynomial equation.

15. The system of claim 12, further comprising a filter to filter the data vector from the received transmission and to provide a signal with the data filtered to the polynomial generator.

16. A tangible, machine-accessible storage medium, wherein the storage medium does not comprise a transitory signal, the storage medium containing instructions to operate a processing system which, when the instructions are executed by a machine, cause said machine to perform operations, comprising:
receiving a signal, the signal having a data vector component and an interfering component;
creating a first set of digitized data that represents at least a portion of the interfering component;
generating a polynomial equation that is related to the first set of digitized data;
generating a second set of digitized data that represents a data vector component of the received signal;
subtracting an estimate of the at least a portion of the interfering component based on the polynomial equation from the signal to cancel at least a portion of the interfering component to provide an interference mitigated signal representing the data vector component; and
recalculating the interference mitigated signal utilizing an error in the interference mitigated signal.

17. The tangible, machine-accessible storage medium of claim 16, which when executed causes the computer to perform data recovery on the data vector component.

18. The tangible, machine-accessible storage medium of claim 16, which when executed causes the computer to down convert the received signal based on a difference frequency based on a carrier frequency related to the data vector component and a carrier frequency related to the interfering component to create a down converter component.

19. The tangible, machine-accessible storage medium of claim 16, which when executed causes the computer to invert a phase of the polynomial equation to create an anti-phase equation.

20. The tangible, machine-accessible storage medium of claim 16, which when executed causes the computer to up convert the recalculated interference mitigated signal.

21. A system comprising:
a data vector module to detect a data vector from a transmission;
a polynomial generator module coupled to the data vector module to generate a polynomial equation representing interference in the transmission;
a subtraction module to subtract an estimate of at least a portion of the interference based on the polynomial equation from the received transmission and to provide an interference mitigated signal;
a recalculation module to determine an error in the interference mitigated signal and to recalculate the interference mitigated signal;
a data recovery module coupled to the subtraction module to recover data from the recalculated interference mitigated signal; and
an antenna coupled with the system to receive the transmission.

22. The system of claim 21, further comprising a phase inverter to invert the phase of the polynomial equation to facilitate the subtraction.

23. The system of claim 21, wherein the polynomial generator further comprising a least squares module to utilize a Vandermonde matrix and a pseudo-inverse Vandermonde matrix and the data vector to estimate the polynomial equation.

24. The system of claim 21, further comprising a filter to filter the data vector from the transmission and to provide a signal with the data filtered to the polynomial generator.

* * * * *